(12) United States Patent
Cheng et al.

(10) Patent No.: US 10,877,327 B2
(45) Date of Patent: Dec. 29, 2020

(54) PIXEL STRUCTURE

(71) Applicant: Au Optronics Corporation, Hsinchu (TW)

(72) Inventors: Wei-Ming Cheng, Taipei (TW); Min-Hsuan Chiu, Taipei (TW); Syuan-Ling Yang, Kaohsiung (TW); Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/524,205

(22) Filed: Jul. 29, 2019

(65) Prior Publication Data

US 2020/0050064 A1 Feb. 13, 2020

(30) Foreign Application Priority Data

Aug. 7, 2018 (TW) .............................. 107127445 A

(51) Int. Cl.

| G02F 1/1337 | (2006.01) |
|---|---|
| G02F 1/1343 | (2006.01) |
| G02F 1/133 | (2006.01) |
| G02F 1/137 | (2006.01) |
| G02F 1/1368 | (2006.01) |

(52) U.S. Cl.
CPC ........ *G02F 1/134363* (2013.01); *G02F 1/137* (2013.01); *G02F 1/1337* (2013.01); *G02F 1/13306* (2013.01); *G02F 1/13439* (2013.01); *G02F 1/1368* (2013.01); *G02F 2001/13706* (2013.01); *G02F 2001/13712* (2013.01); *G02F 2001/133738* (2013.01); *G02F 2001/134318* (2013.01); *G02F 2201/122* (2013.01); *G02F 2201/123* (2013.01)

(58) Field of Classification Search
None
See application file for complete search history.

(56) References Cited

U.S. PATENT DOCUMENTS

| 6,738,120 | B1 | 5/2004 | Song et al. |
|---|---|---|---|
| 7,327,429 | B2 | 2/2008 | Kim et al. |
| 7,492,428 | B2 | 2/2009 | Lee |
| 7,773,183 | B2 * | 8/2010 | Son .................. G02F 1/134363 349/141 |
| 10,026,374 | B2 | 7/2018 | Ito et al. |
| 2019/0004213 | A1 | 1/2019 | Tung et al. |

\* cited by examiner

*Primary Examiner* — Richard H Kim
(74) *Attorney, Agent, or Firm* — JCIPRNET

(57) ABSTRACT

A pixel structure including an active device, a first electrode and a second electrode is provided. The first electrode includes a main portion, first branch portions, a first auxiliary portion and a second auxiliary portion. The second electrode includes second branch portions and a peripheral portion. The main portion extends in a first direction. The first branch portions and the second branch portions cross with the main portion and are arranged alternately in the first direction. Each first branch portion has a first end and a second end located on two opposite sides of the main portion respectively. The first auxiliary portion is connected to the first ends of the first branch portions. The second auxiliary portion is connected to the second ends of the first branch portions. The first auxiliary portion and the second auxiliary portion of the first electrode overlap the peripheral portion of the second electrode.

20 Claims, 22 Drawing Sheets

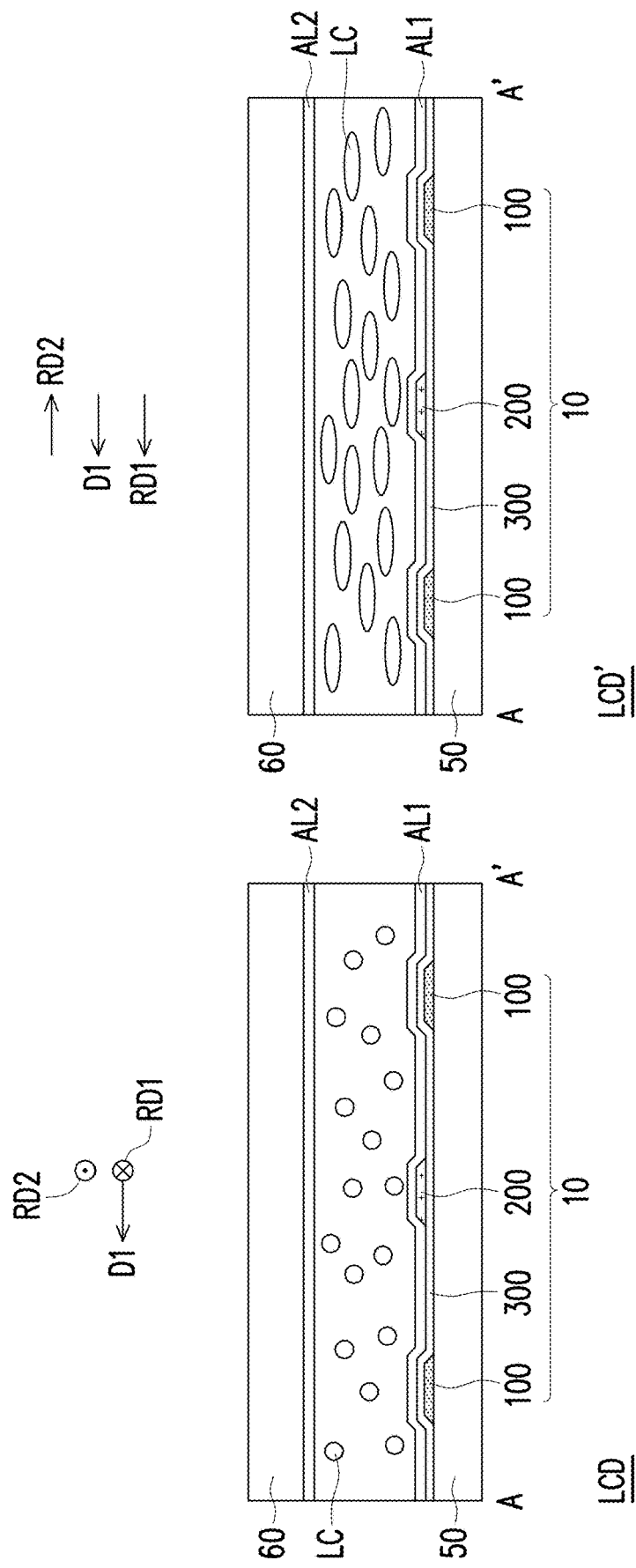

US 10,877,327 B2

PIXEL STRUCTURE

CROSS REFERENCE TO RELATED APPLICATION

This application claims the priority benefit of Taiwan application serial no. 107127445, filed on Aug. 7, 2018. The entirety of the above-mentioned patent application is hereby incorporated by reference herein and made a part of specification.

BACKGROUND OF THE INVENTION

1. Technical Field

The disclosure relates to a pixel structure, and more particularly to a pixel structure used in a display panel.

2. Description of Related Art

As the size of the eSports market is becoming larger and larger, portable laptops specifically designed for eSports are one of key products that various electronics manufacturers have devoted to developing over the recent years. How to provide consumers with a portable eSports product with high performance, low energy consumption and high display quality is a vital challenge with which all the manufacturers are confronted, and a display panel with low energy consumption, high resolution, rapid response speeds and wide viewing angles is especially indispensable.

Display panels in in-planes switching (IPS) and fringe field switching (FFS) modes are characterized by wide viewing angles, rapid response speeds and high contrast; therefore, most of the manufacturers use the display panels in an in-planes switching mode or a fringe field switching mode in the production of eSports products to meet eSports players' demand for high display quality. However, how to maintain high transmittance to reduce the dissipated power of eSports products while increasing response speeds continuously is one of the issues that the manufacturers face.

SUMMARY OF THE INVENTION

The disclosure provides a pixel structure with high performance.

The pixel structure according to an embodiment of the disclosure includes an active device, a first electrode, and a second electrode. The first electrode is disposed on the active device and includes a main portion, a plurality of first branch portions, a first auxiliary portion, and a second auxiliary portion. The main portion extends in a first direction. The plurality of first branch portions cross with the main portion. Each of the first branch portions has a first end and a second end located on two opposite sides of the main portion respectively. The first auxiliary portion is connected to the plurality of first ends of the plurality of first branch portions. The second auxiliary portion is connected to the plurality of second ends of the plurality of first branch portions. The first electrode or the second electrode is electrically connected to the active device. A first insulating layer is disposed between the first electrode and the second electrode. The second electrode includes a plurality of second branch portions crossing with the main portion and a peripheral portion. The plurality of first branch portions and the plurality of second branch portions are arranged alternately in the first direction. Each of the second branch portions has a first end and a second end located on two opposite sides of the main portion respectively. The peripheral portion is connected to the plurality of first ends of the plurality of second branch portions and the plurality of second ends of the plurality of second branch portions. The first auxiliary portion and the second auxiliary portion of the first electrode overlap the peripheral portion of the second electrode.

In an embodiment of the disclosure, the first electrode of the pixel structure further includes a third auxiliary portion crossing with the main portion, disposed between two adjacent first branch portions and separated from the first auxiliary portion and the second auxiliary portion. The third auxiliary portion of the first electrode overlaps the second branch portion of the second electrode.

In an embodiment of the disclosure, a first insulating layer of the pixel structure covers the first electrode, the second electrode is disposed on the first insulating layer, and the third auxiliary portion of the first electrode is located within a normal projection area of the second branch portion of the second electrode.

In an embodiment of the disclosure, the third auxiliary portion of the pixel structure has an edge that is neither parallel to nor perpendicular to the first direction, the second branch portion has an edge that is neither parallel to nor perpendicular to the first direction, and the edge of the third auxiliary portion is parallel to the edge of the second branch portion.

In an embodiment of the disclosure, each of the second branch portions of the pixel structure further includes a first sub portion and a second sub portion that are located on two opposite sides of the main portion respectively. A width of the first sub portion gradually increases from the peripheral portion to the main portion, and a width of the second sub portion gradually increases from the peripheral portion to the main portion.

In an embodiment of the disclosure, each of the second branch portions of the pixel structure further includes a third sub portion and a fourth sub portion that are located on the main portion. The third sub portion is connected between the first sub portion and the fourth sub portion. A width of the third sub portion gradually decreases from the first sub portion to the fourth sub portion. The fourth sub portion is connected between the third sub portion and the second sub portion. A width of the fourth sub portion gradually decreases from the second sub portion to the third sub portion. The third sub portion and the fourth sub portion are connected to each other to define two notches recessed in two opposite directions.

In an embodiment of the disclosure, each of the second branch portions of the pixel structure further includes a first sub portion and a second sub portion that are located on two opposite sides of the main portion respectively. A width of the first sub portion gradually decreases from the peripheral portion to the main portion, and a width of the second sub portion gradually decreases from the peripheral portion to the main portion.

In an embodiment of the disclosure, each of the first branch portions of the pixel structure further includes a first sub portion and a second sub portion that are located on two opposite sides of the main portion respectively. A width of the first sub portion gradually decreases from the main portion to the first auxiliary portion, and a width of the second sub portion gradually decreases from the main portion to the second auxiliary portion.

In an embodiment of the disclosure, each of the second branch portions of the pixel structure further includes a first sub portion and a second sub portion that are located on two opposite sides of the main portion respectively. The first sub portion of the first branch portion has a first edge and a second edge that are opposite each other and are not parallel to each other. The first sub portion of the second branch portion has a first edge and a second edge that are opposite each other and are not parallel to each other. The first edge of the first sub portion of the first branch portion is parallel to the first edge of the first sub portion of the second branch portion, and the second edge of the first sub portion of the first branch portion is parallel to the second edge of the first sub portion of the second branch portion. The second sub portion of the first branch portion has a first edge and a second edge that are opposite each other and are not parallel to each other, and the second sub portion of the second branch portion has a first edge and a second edge that are opposite each other and are not parallel to each other. The first edge of the second sub portion of the first branch portion is parallel to the first edge of the second sub portion of the second branch portion, and the second edge of the second sub portion of the first branch portion is parallel to the second edge of the second sub portion of the second branch portion.

In an embodiment of the disclosure, the pixel structure further includes a light-shielding pattern layer having a pixel opening. The main portion of the first electrode, the plurality of first branch portions of the first electrode, and the plurality of second branch portions of the second electrode overlap the pixel opening. The second branch portions of the second electrode and the peripheral portion of the second electrode define a plurality of grooves, and the light-shielding pattern layer shields the plurality of grooves.

In an embodiment of the disclosure, the first end of each of the first branch portions and the second end of each of the first branch portions of the pixel structure extend below the light-shielding pattern layer. The light-shielding pattern layer shields the first end of each of the first branch portions, the second end of each of the first branch portions, the first auxiliary portion, and the second auxiliary portion.

In an embodiment of the disclosure, the peripheral portion of the second electrode of the pixel structure has a plurality of arc-shaped edges, and the plurality of arc-shaped edges and the plurality of second branch portions define the plurality of grooves.

In an embodiment of the disclosure, the plurality of first branch portions of the pixel structure include a plurality of first branch groups arranged along the first direction. Each of the first branch groups includes at least two first branch groups, the first auxiliary portion includes a plurality of first auxiliary sub portions separated from each other, and each of the first auxiliary sub portions is connected to the plurality of first ends of the at least two first branch portions of a corresponding first branch group of the first branch groups.

In an embodiment of the disclosure, the pixel structure further includes an alignment film and a plurality of positive-type liquid crystal molecules. The alignment film is disposed on the first electrode or the second electrode. The plurality of positive-type liquid crystal molecules are disposed on the alignment film, and a rubbing direction of the alignment film is perpendicular to the first direction.

In an embodiment of the disclosure, the pixel structure further includes an alignment film and a plurality of negative-type liquid crystal molecules. The alignment film is disposed on the first electrode or the second electrode. The plurality of negative-type liquid crystal molecules are disposed on the alignment film, and a rubbing direction of the alignment film is parallel to the first direction.

In an embodiment of the disclosure, the pixel structure further includes a third electrode. A second insulating layer is disposed between the first electrode and the third electrode or between the second electrode and the third electrode. The third electrode overlaps an area between the plurality of first branch portions of the first electrode and the plurality of second branch portions of the second electrode.

In an embodiment of the disclosure, the third electrode of the pixel structure has a constant electric potential.

In an embodiment of the disclosure, the first electrode and the second electrode of the pixel structure have a first drive signal and a second drive signal respectively. A waveform of the first drive signal is the same as a waveform of the second drive signal, and the polarity of the first drive signal is opposite to the polarity of the second drive signal.

In an embodiment of the disclosure, a material of the main portion, materials of the plurality of first branch portions, materials of the plurality of second branch portions of the pixel structure, or a combination of at least two of the above include light-shielding conductive materials.

In an embodiment of the disclosure, a material of the main portion, materials of the plurality of first branch portions, materials of the plurality of second branch portions of the pixel structure, or a combination of at least two of the above are metals having a thickness between 300 Å and 1000 Å.

In view of the above, in the pixel structure according to the embodiments of the disclosure, an aperture ratio of the pixel structure is raised through the first auxiliary portion and the second auxiliary portion of the first electrode overlapping the peripheral portion of the second electrode respectively on the premise that sufficient storage capacitances are available. Additionally, when the display panel using the pixel structure according to the embodiments of the disclosure is operated with appropriate voltages and the display panel is pressed, the recoverability of the arrangement of liquid crystal molecules of the pixel structure is preferable.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8 is a cross-sectional view of a display panel using a pixel structure according to a first embodiment of the disclosure.

FIG. 9 is a cross-sectional view of another display panel using a pixel structure according to a first embodiment of the disclosure.

DESCRIPTION OF THE EMBODIMENTS

Figure 1:
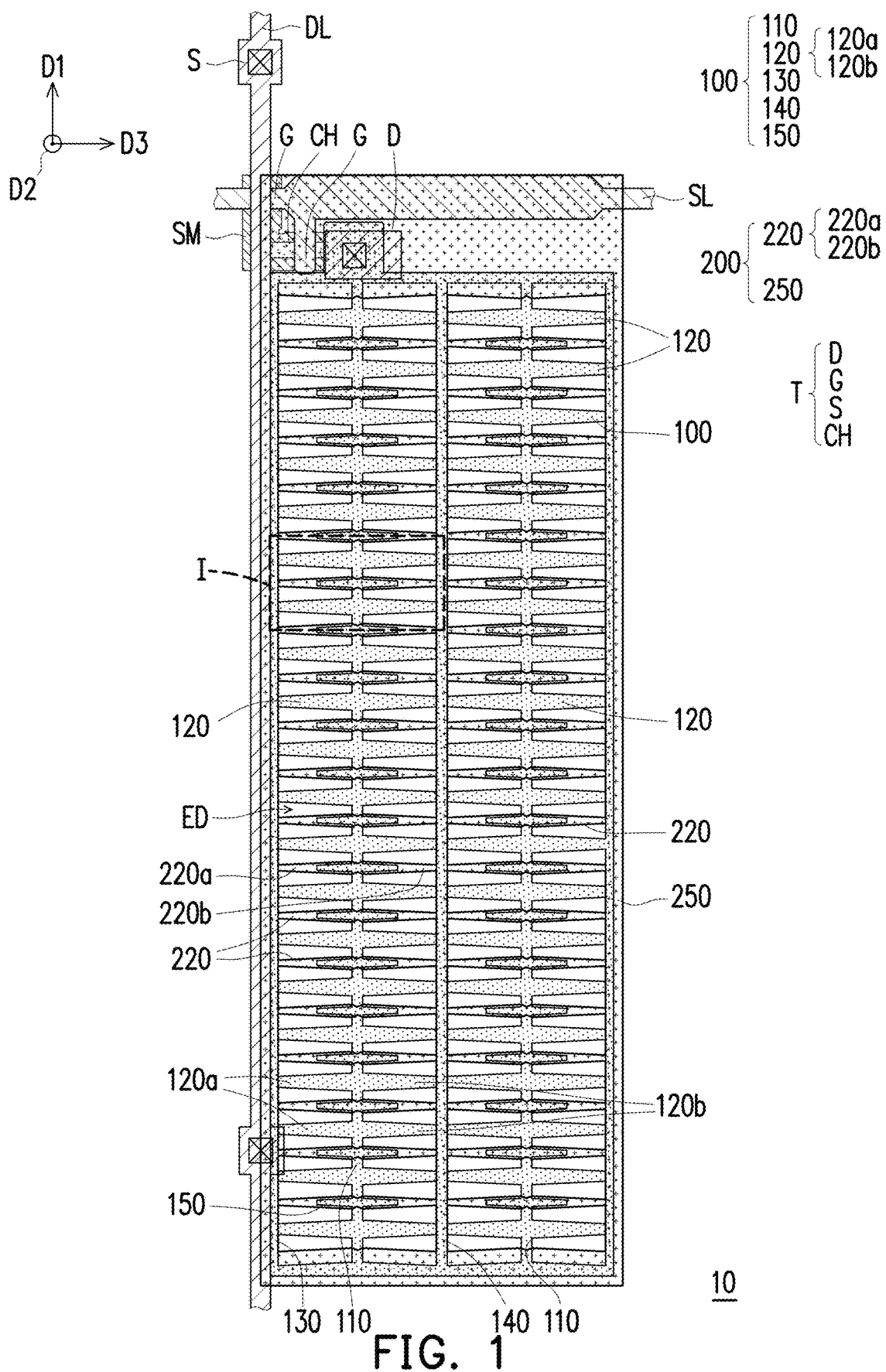
FIG. 1 is a front view of a pixel structure according to a first embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Figure 2:
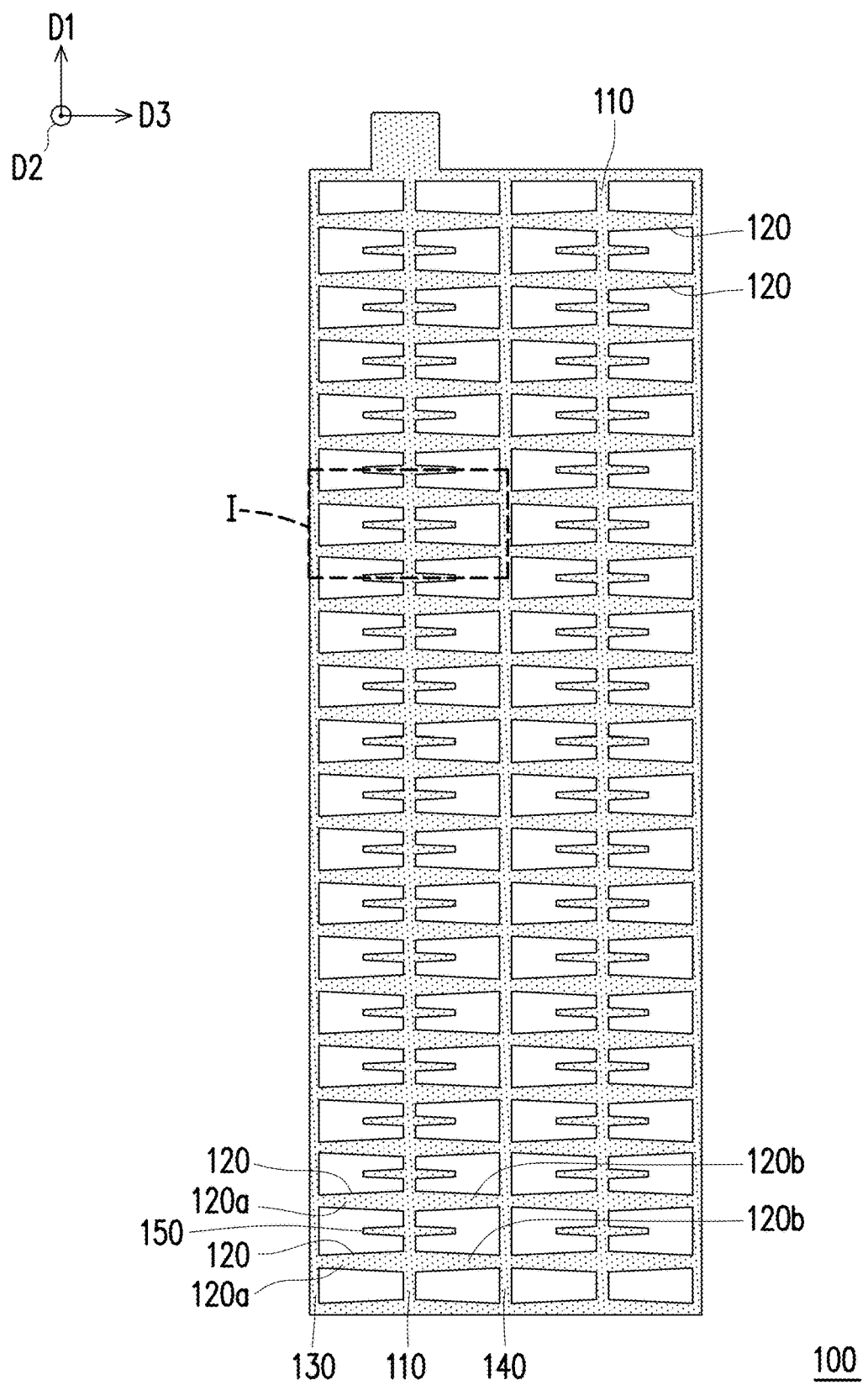
FIG. 2 is a front view of a first electrode of a pixel structure according to a first embodiment of the disclosure.
Figure 3:
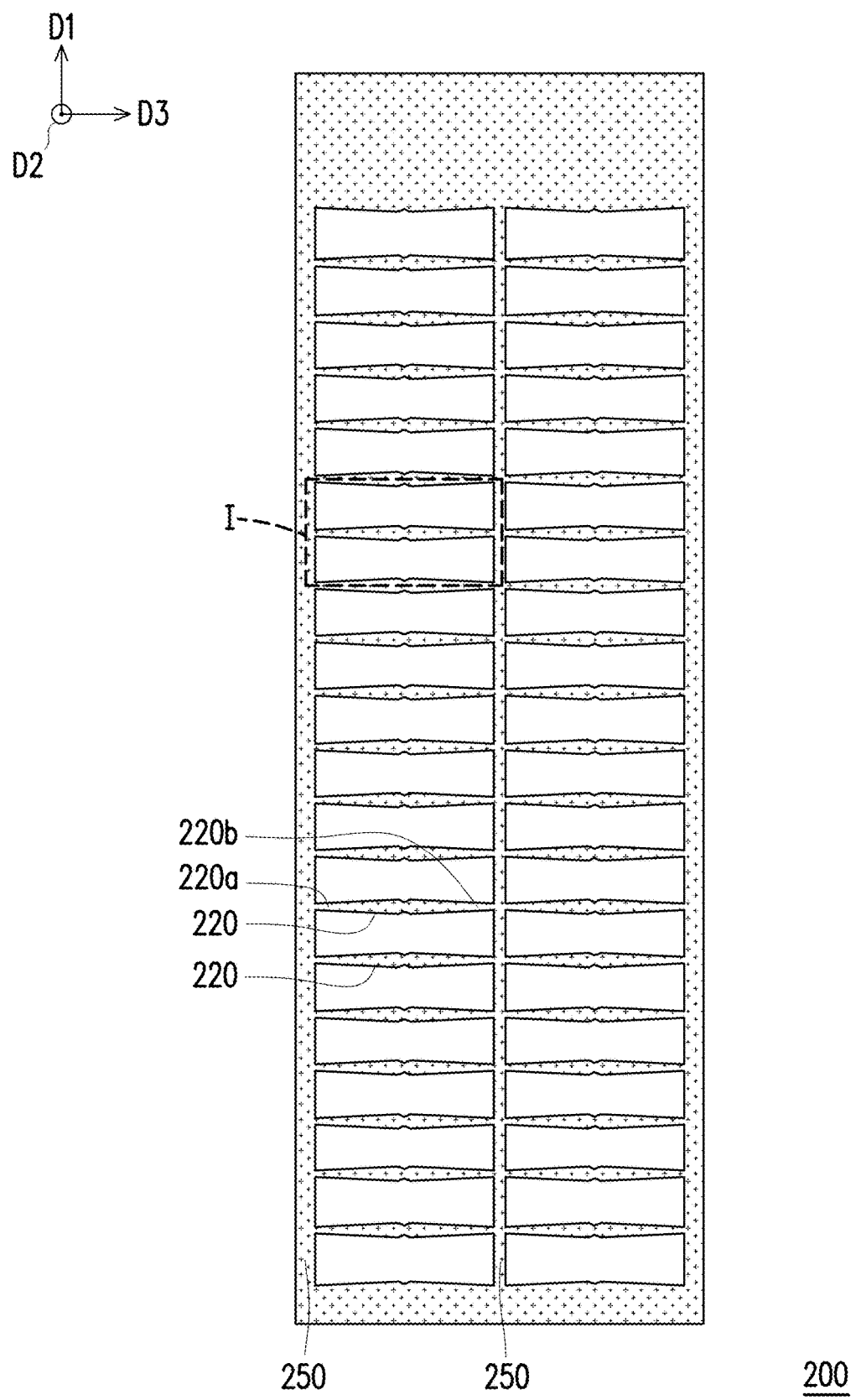
FIG. 3 is a front view of a second electrode of a pixel structure according to a first embodiment of the disclosure.
Figure 4:
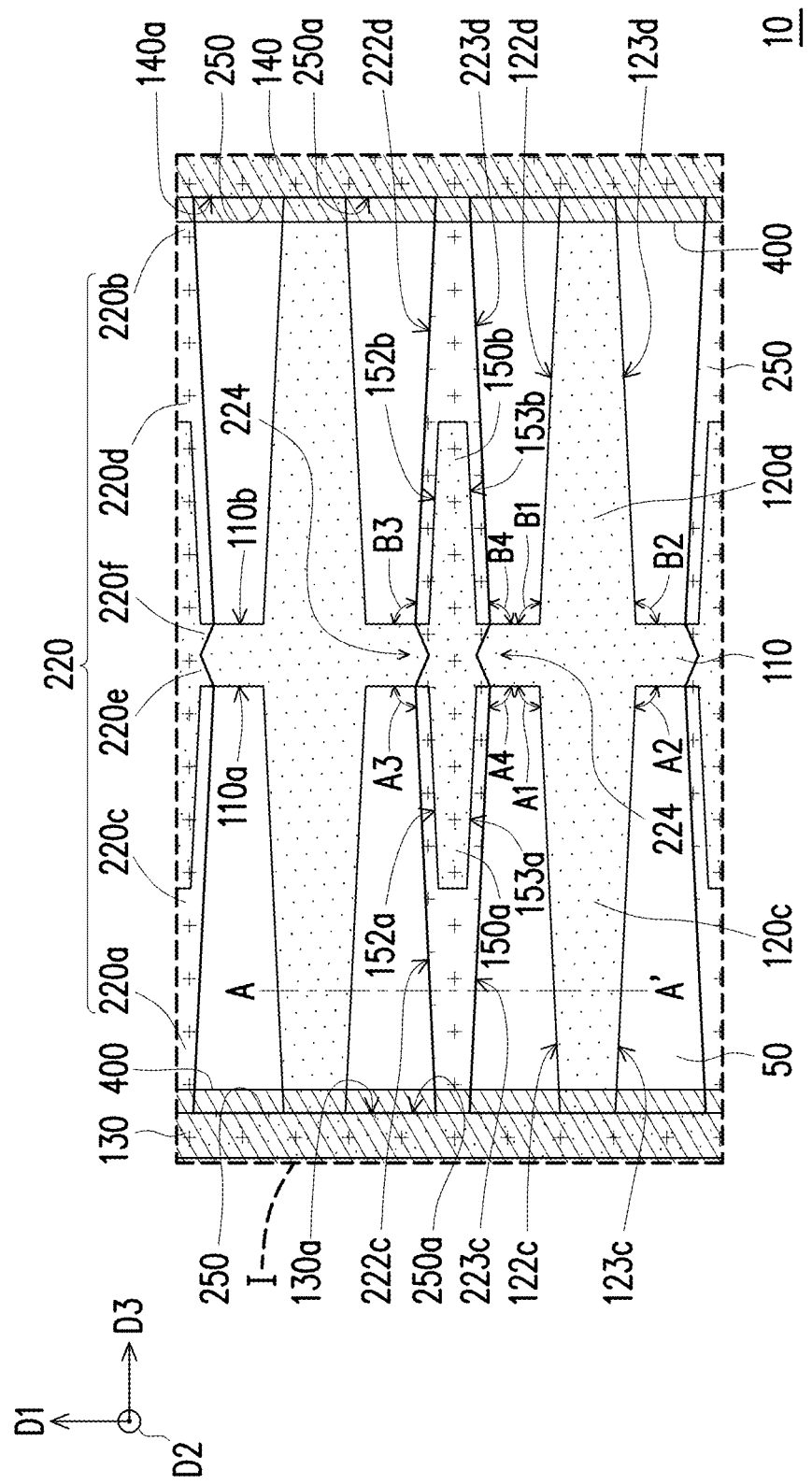
FIG. 4 is an enlarged view of a local area I of the pixel structure of FIG. 1.
Figure 5:
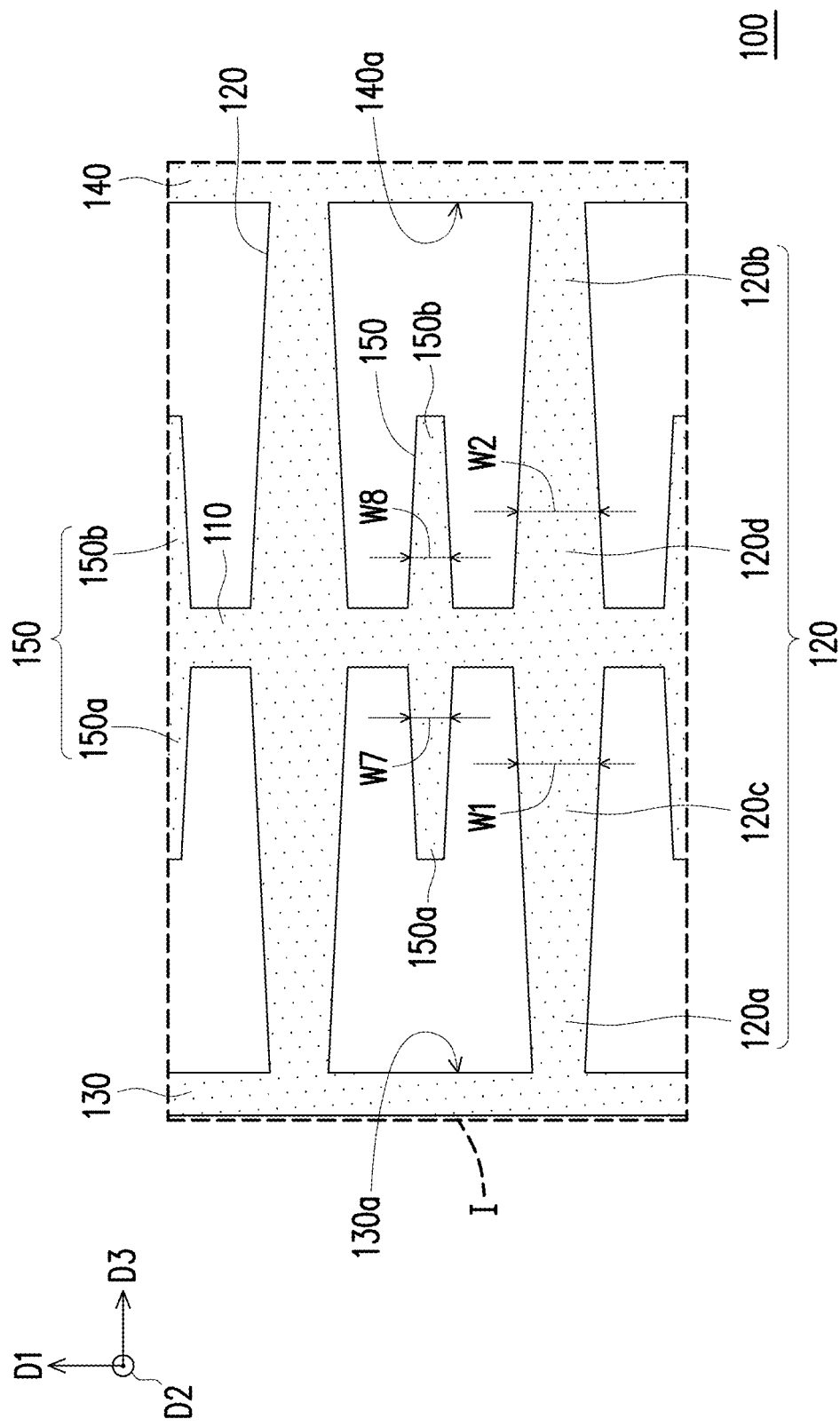
FIG. 5 is an enlarged view of a local area I of the first electrode of FIG. 2.
Figure 6:
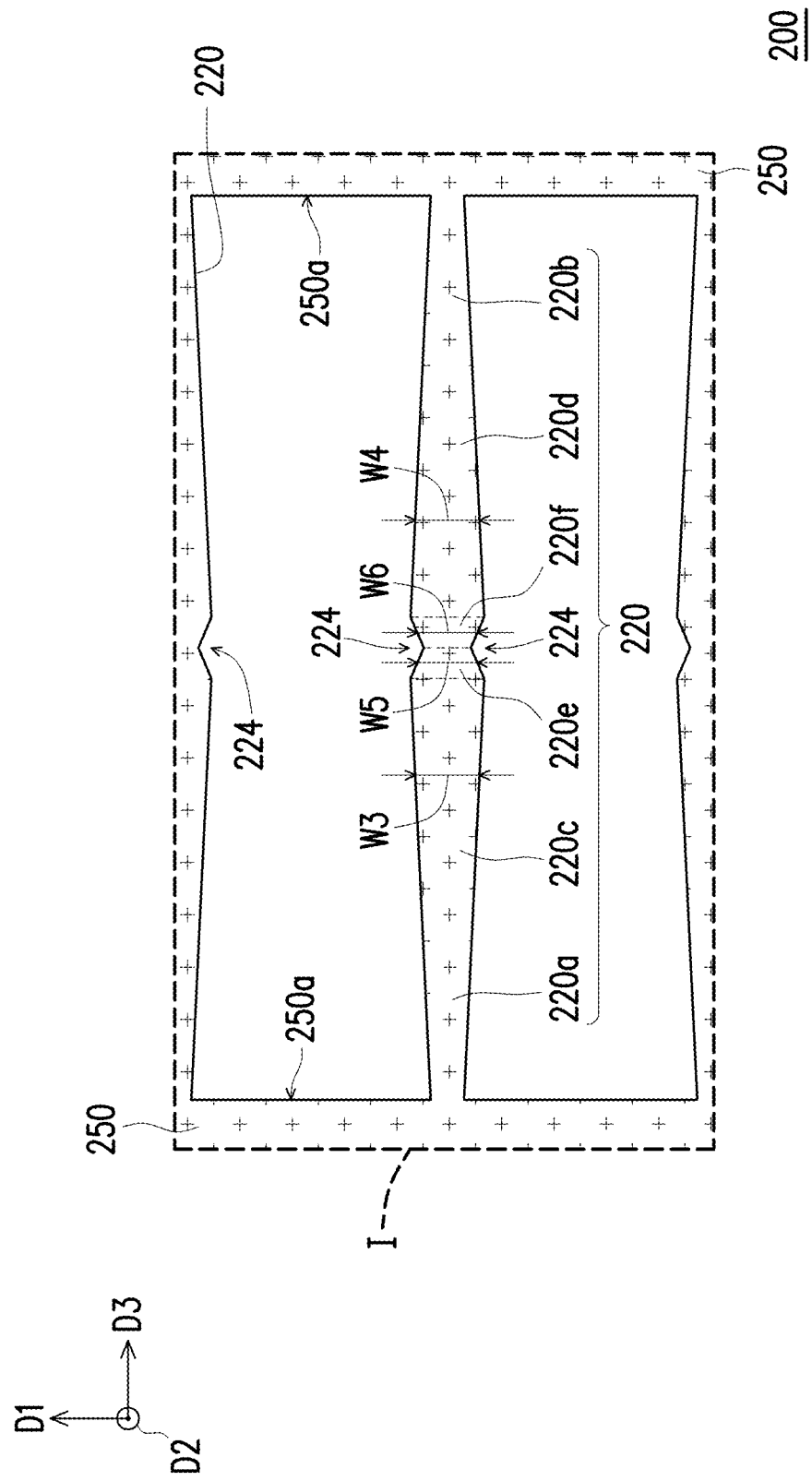
FIG. 6 is an enlarged view of a local area I of the second electrode of FIG. 3.

FIG. 1 is a front view of a pixel structure 10 according to a first embodiment of the disclosure. FIG. 2 is a front view of a first electrode 100 of the pixel structure 10 according to the first embodiment of the disclosure. FIG. 3 is a front view of a second electrode 200 of the pixel structure 10 according to the first embodiment of the disclosure. FIG. 4 is an enlarged view of a local area I of the pixel structure 10 of FIG. 1. FIG. 5 is an enlarged view of a local area I of the first electrode 100 of FIG. 2. FIG. 6 is an enlarged view of a local area I of the second electrode 200 of FIG. 3. It should be explained that for clear illustration, a light-shielding pattern layer 400 of FIG. 4 is omitted from FIG. 1.

Referring to FIG. 1, in the embodiment, the pixel structure 10 includes an active device T, a data line DL, and a scan line SL. The active device T includes a thin-film transistor and has a source S, a drain D, a gate G, and a semiconductor pattern CH. In the embodiment, the gate G may be optionally disposed above the semiconductor pattern CH to form a top-gate thin-film transistor (i.e. a top-gate TFT). Additionally, a shading metal SM may be optionally disposed below the semiconductor pattern CH of the top-gate thin-film transistor. However, the disclosure is not limited to the embodiment. According to other embodiments, the active device T may also be a bottom-gate thin-film transistor (i.e. a bottom-gate TFT) or other appropriate types of thin-film transistors. For example, in the embodiment, a structure of the semiconductor pattern CH may be one or more layers, and a material of the semiconductor pattern CH may include amorphous silicon, polycrystalline silicon, microcrystalline silicon, single crystal silicon, organic semiconductor materials, oxide semiconductor materials (e.g., indium zinc oxide, indium gallium zinc oxide, other appropriate materials, or a combination thereof), other appropriate materials, the above materials containing dopants, or a combination thereof.

In the embodiment, the gate G is electrically connected to the scan line SL, the source S is electrically connected to the data line DL, and the source S and the drain D are electrically connected to two different areas of the semiconductor pattern CH respectively. For example, in the embodiment, materials of the gate G and the scan line SL may be identical. That is, the gate G and the scan line SL may be formed in the same film layer. Additionally, in the embodiment, materials of the source S, the drain D, and the data line DL may be identical. That is, the source S, the drain D, and the data line DL may be formed in the same film layer. Considering conductivity, materials of the gate G, the source S, the drain D, the scan line SL, and the data line DL are generally metallic materials. However, the disclosure is not limited to the embodiment. According to other embodiments, the gate G, the source S, the drain D, the scan line SL, and the data line DL may also be made of other conductive materials, such as alloys, nitride of metallic materials, oxide of metallic materials, nitric oxide of metallic materials, other appropriate materials, or stacking layers of metallic materials and other conductive materials.

Referring to FIGS. 1 and 2, in the embodiment, the pixel structure 10 further includes the first electrode 100. In the embodiment the first electrode 100, for example, is a pixel electrode which is electrically connected to the drain D of the active device T, but the disclosure is not limited thereto. Referring to FIGS. 2 and 5, in the embodiment, the first electrode 100 includes a main portion 110, a plurality of first branch portions 120, a first auxiliary portion 130, and a second auxiliary portion 140. The main portion 110 extends in a first direction D1. The plurality of first branch portions 120 cross with the main portion 110, and each of the first branch portions 120 has a first end 120a and a second end 120b located on two opposite sides of the main portion 110 respectively. The third auxiliary portion 130 is connected to the plurality of first ends 120a of the plurality of first branch portions 120. The second auxiliary portion 140 is connected to the plurality of second ends 120b of the plurality of first branch portions 120.

Referring to FIG. 5, in the embodiment, each of the first branch portions 120 further includes a first sub portion 120c and a second sub portion 120d that are located on two opposite sides of the main portion 110 respectively. The first sub portion 120c is connected between the first end 120a and the main portion 110. The second sub portion 120d is connected between the second end 120b and the main portion 110. For example, in the embodiment, a width W1 of the first sub portion 120c gradually decreases from the main portion 110 to the first auxiliary portion 130, and a width W2 of the second sub portion 120d gradually decreases from the main portion 110 to the second auxiliary portion 140. However, the disclosure is not limited to the embodiment.

Referring to FIGS. 2 and 5, the first electrode 100 may include an optional third auxiliary portion 150 that crosses with the main portion 100. The third auxiliary portion 150 is disposed between the two adjacent first branch portions 120 and is separated from the third auxiliary portion 130 and the second auxiliary portion 140. The plurality of third auxiliary portions 150 and the plurality of first branch portions 120 may be arranged alternately in the first direction D1. Referring to FIG. 5, in the embodiment, the third auxiliary portion 150 includes a fifth sub portion 150a and a sixth sub portion 150b that are located on two opposite sides of the main portion 110 respectively. The fifth sub portion 150a is located between the first auxiliary portion 130 and the main portion 110, and the sixth sub portion 150b is located between the main portion 110 and the second auxiliary portion 140. For example, in the embodiment, a width W7 of the fifth sub portion 150a gradually decreases from the main portion 110 to the third auxiliary portion 130, and a width W8 of the sixth sub portion 150b gradually decreases from the main portion 110 to the second auxiliary portion 140. However, the disclosure is not limited to the embodiment.

Figure 7:
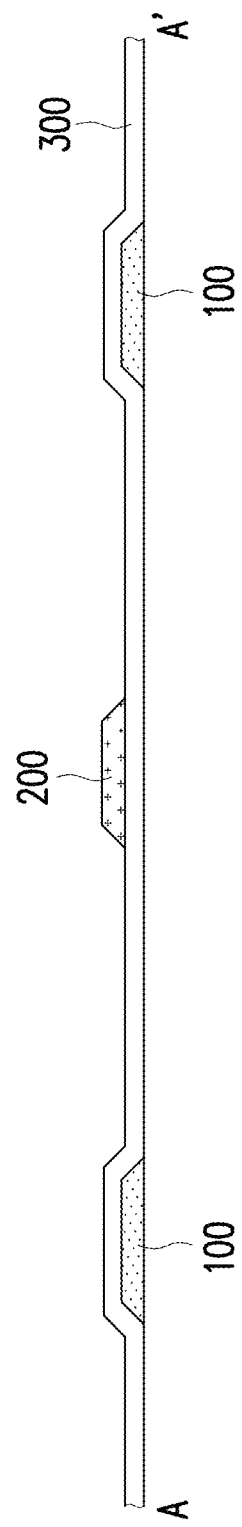
FIG. 7 is a cross-sectional view of a pixel structure according to a first embodiment of the disclosure.

FIG. 7 is a cross-sectional view of a pixel structure according to the first embodiment of the disclosure. Particularly, FIG. 7 is a cross-section of FIG. 4 taken along section line A-A', and a film layer below the first electrode 100 of the pixel structure 10 is omitted from FIG. 7. Referring to FIGS. 1, 3 and 7, in the embodiment, the pixel structure 10 further includes a second electrode 200 disposed on the first electrode 100. In detail, the pixel structure 10 further includes a first insulating layer 300 disposed between the first electrode 100 and the second electrode 200. For example, the first insulating layer 300 may cover the first electrode 100, and the second electrode 200 is disposed on the first insulating layer 300. However, the disclosure is not limited to the embodiment. According to other embodiments, the first electrode 100 may also be disposed on the second electrode 200. One of the first electrode 100 and the second electrode 200 may serve as a pixel electrode, and the other of the first electrode 100 and the second electrode 200 may serve as a common electrode. For example, in the embodiment, the first electrode 100 may be electrically connected to the active device T as a pixel electrode, and the second electrode 200 may serve as a common electrode. However, the disclosure is not limited to the embodiment. According to other embodiments, the second electrode 200 may also be electrically connected to the active device T as a pixel electrode, and the first electrode 100 may also serve as a common electrode.

Referring to FIGS. 4 and 6, in the embodiment, the second electrode 200 includes a plurality of second branch portions 220 and a peripheral portion 250. The plurality of second branch portions 220 cross with the main portion 110. Each of the second branch portions 220 has a first end 220a and a second end 220b that are located on two opposite sides of the main portion 110 respectively. The peripheral portion 250 is connected to the plurality of second ends 220a of the plurality of second branch portions 220 and the plurality of second ends 220b of the plurality of second branch portions 220. Referring to FIGS. 3, 4 and 6, for example, in the embodiment, the plurality of second branch portions 220 are arranged in a line in the first direction D1, and the peripheral portion 250 may include a frame pattern surrounding the line (as shown in FIG. 3). However, the disclosure is not limited to the embodiment.

Referring to FIGS. 4 and 6, in the embodiment, each of the second branch portions 220 further includes a first sub portion 220c and a second sub portion 220d that are located on two opposite sides of the main portion 110 respectively. The first end 220a is connected between the first end 220c and the peripheral portion 250. The second end 220b is connected between the second sub portion 220d and the peripheral portion 250. For example, in the embodiment, a width W3 of the first sub portion 220c gradually increases from the peripheral portion 250 to the main portion 110, and a width W4 of the second sub portion 220d gradually increases from the peripheral portion 250 to the main portion 110. However, the disclosure is not limited to the embodiment.

In the embodiment, each of the second branch portions 220 further includes a third sub portion 220e and a fourth sub portion 220f that are disposed on the main portion 110. The third sub portion 220e and the fourth sub portion 220f of the second branch portion 220 overlap the main portion 110. The third sub portion 220e is connected between the first sub portion 220c and the fourth sub portion 220f. The fourth sub portion 220f is connected between the third sub portion 220e and the second sub portion 220d. For example, in the embodiment, a width W5 of the third sub portion 220e gradually decreases from the first sub portion 220c to the fourth sub portion 220f, a width W6 of the fourth sub portion 220f gradually decreases from the second sub portion 220d to the third sub portion 220e, and the third sub portion 220e and the fourth sub portion 220f are connected to each other to define two notches 224 recessed in opposite directions. However, the disclosure is not limited to the embodiment.

In the embodiment, for example, the first electrode 110 and the second electrode 200 are transparent electrodes, whose material include metallic oxides such as indium tin oxide, indium zinc oxide, aluminum tin oxide, aluminum zinc oxide, other appropriate oxides, or stacking layers of at least two of the above. However, the embodiment is not limited to the embodiment. According to other embodiments, a material of the main portion 110, materials of the plurality of first branch portions 120, materials of plurality of second branch portions 220 of the pixel structure 10 or a combination of at least two of the above may also include light-shielding conductive materials.

Referring to FIGS. 1 and 4, in the embodiment, the plurality of first branch portions 120 of the first electrode 110 and the plurality of second branch portions 220 of the second electrode 200 are arranged alternately in the first direction D1, and each of the first branch portions 120 does not overlap each of the second branch portions 220 in a second direction D2 perpendicular to the first direction D1. In the embodiment, the first auxiliary portion 130 and the second auxiliary portion 140 of the first electrode 110 overlap the peripheral portion 250 of the second electrode 200, and the third auxiliary portion 150 of the first electrode 100 overlaps the second branch portion 220 of the second electrode 200 to form a storage capacitance. For example, in the embodiment, the third auxiliary portion 150 of the first electrode 100 is located within a normal projection area of the second branch portion 220 of the second electrode 200, but the disclosure is not limited to the embodiment.

In the embodiment, the first branch portion 120 of the first electrode 100, the second branch portion 220 of the second electrode 200, the main portion 110 of the first electrode 100, and the peripheral portion 250 of the second electrode 200 define an electrode domain ED (shown in FIG. 1) having a small area (shown in FIG. 1), and the electrode domain ED having a small area benefits to reduce the response time of a liquid crystal display panel using the pixel structure 10. In particular, in the embodiment, the first auxiliary portion 130, the second auxiliary portion 140, and the third auxiliary portion 150 of the first electrode 100 for forming a storage capacitance overlap the peripheral portion 250 and the second branch portion 220 of the second electrode 200 for defining the electrode domain ED, and the first auxiliary portion 130, the second auxiliary portion 140 and the third auxiliary portion 150 do not necessarily occupy other areas in order to form a storage capacitance. In this way, an aperture ratio of the pixel structure 10 may be raised on the premise that a storage capacitance is available.

Referring to FIGS. 4, 5 and 6, in the embodiment, the first auxiliary portion 130 of the first electrode 100 has an edge 130a close to the main portion 110, the second auxiliary portion 140 of the first electrode 100 has an edge 140a close to the main portion 110, and the peripheral portion 250 of the second electrode 200 has an edge 250a close to the second branch portion 220. For example, in the embodiment, the edge 250a of the peripheral portion 250 of the second electrode 200 may be substantially aligned with the edge 130a of the first auxiliary portion 130 of the first electrode 100, and the edge 250a of the peripheral portion 250 of the second electrode 200 may be substantially aligned with the edge 140a of the second auxiliary portion 140 of the first electrode 100. However, the disclosure is not limited to the embodiment.

Referring to FIG. 4, in the embodiment, the first sub portion 120c of the first branch portion 120 has a first edge 122c and a second edge 123c that are opposite to each other and are not parallel to each other, and the first sub portion 220c of the second branch portion 220 has a first edge 222c and a second edge 223c that are opposite to each other and are not parallel to each other. For example, in the embodiment, the first edge 122c of the first sub portion 120c of the first branch portion 120 may be substantially parallel to the first edge 222c of the first sub portion 220c of the second branch portion 220, and the second edge 123c of the first sub portion 120c of the first branch portion 120 may be substantially parallel to the second edge 223c of the first sub portion 220c of the second branch portion 220. However, the disclosure is not limited to the embodiment. In the embodiment, the first edge 122c and the second edge 123c of the first sub portion 120c of the first branch portion 120 are neither parallel to nor perpendicular to the first direction D1, and the first edge 222c and the second edge 223c of the first sub portion 220c of the second branch portion 220 are neither parallel to nor perpendicular to the first direction D1. However, the disclosure is not limited to the embodiment.

In the embodiment, a first included angle A1 is between the normal projection of the first edge 122c of the first sub portion 120c and the normal projection of a side 110a of the main portion 110, a second included angle A2 is between the normal projection of the second edge 123c of the first sub portion 120c and the normal projection of the side 110a of the main portion 110, a third included angle A3 is between the normal projection of the first edge 222c of the first sub portion 220c and the normal projection of the side 110a of the main portion 110, and a fourth included angle A4 is between the normal projection of the second edge 223c of the first sub portion 220c and the normal projection of the side 110a of the main portion 110. For example, in the embodiment, the first included angle A1, the second included angle A2, the third included angle A3, and the fourth included angle A4 are substantially identical and are in a range from 91 degree to 95 degree, for example. However, the disclosure is not limited to the embodiment.

Similarly, in the embodiment, the second sub portion 120d of the first branch portion 120 has a first edge 122d and a second edge 123d that are opposite to each other and are not parallel to each other, and the second sub portion 220d of the second branch portion 220 has a first edge 222d and a second edge 223d that are opposite to each other and are not parallel to each other. For example, in the embodiment, the first edge 122d of the second sub portion 120d of the second branch portion 120 is parallel to the first edge 222d of the second sub portion 220d of the second branch portion 220, and the second edge 123d of the second sub portion 120d of the first branch portion 120 is parallel to the second edge 223d of the second sub portion 220d of the second branch portion 220. However, the disclosure is not limited to the embodiment. In detail, in the embodiment, the first edge 122d and the second edge 123d of the second sub portion 120d of the first branch portion 120 is neither parallel to nor perpendicular to the first direction D1, and the first edge 222d and the second edge 223d of the second sub portion 220d of the second branch portion 220 is neither parallel to nor perpendicular to the first direction D1. However, the disclosure is not limited to the embodiment.

In the embodiment, a first included angle B1 is between the normal projection of the first edge 122d of the second sub portion 120d and the normal projection of a side 110b of the main portion 110, a second included angle B2 is between the normal projection of the second edge 123d of the second sub portion 120d and the normal projection of the side 110b of the main portion 110, a third included angle B3 is between the normal projection of the first edge 222d of the second sub portion 220d and the normal projection of the side 110b of the main portion 110, and a fourth included angle B4 is between the normal projection of the second edge 223d of the second sub portion 220d and the normal projection of the side 110b of the main portion 110. For example, in the embodiment, the first included angle B1, the second included angle B2, the third included angle B3, and the fourth included angle B4 are substantially identical and are in a range from 91 degree to 95 degree, for example. However, the disclosure is not limited to the embodiment.

In the embodiment, the fifth sub portion 150a of the third auxiliary portion 150 has a first edge 152a and a second edge 153a that are opposite to each other and are not parallel to each other, and the sixth sub portion 150b of the third auxiliary portion 150 has a first edge 152b and a second edge 153b that are opposite to each other and are not parallel to each other. In the embodiment, the first edges 152a and 152b and the second edges 153a and 153b of the third auxiliary portion 150 are neither parallel to nor perpendicular to the first direction D1. However, the disclosure is not limited to the embodiment. For example, in the embodiment, the first edge 152a of the fifth sub portion 150a of the third auxiliary portion 150 is parallel to the first edge 222c of the first sub portion 220c of the second branch portion 220, the second edge 153a of the fifth sub portion 150a of the third auxiliary portion 150 is parallel to the second edge 223c of the first sub portion 220c of the second branch portion 220, the first edge 152b of the sixth sub portion 150b of the third auxiliary portion 150 is parallel to the first edge 222d of the second sub portion 220d of the second branch portion 220, and the second edge 153b of the sixth sub portion 150b of the third auxiliary portion 150 is parallel to the second edge 223d of the second sub portion 220d of the second branch portion 220. However, the disclosure is not limited to the embodiment.

Referring to FIGS. 1 and 4, a member in an area I of FIG. 4 may be viewed as a repeated unit of the pixel structure 10 of FIG. 1. The pixel structure 10 may include a plurality of repeated units that are connected to each other. Each repeated unit has the electrode domain of a constant and appropriate size to allow rapid response time for a display panel using the pixel structure 10. On the premise that each repeated unit has the electrode domain ED of an appropriate size, persons of ordinary skill in the art may determine the number of the repeated units included in the pixel structure 10 based on the resolution of the display panel to be achieved. For example, in the embodiment, the pixel structure 10 may include lines of repeated units. The plurality of repeated units in each line are arranged in the first direction D1, the plurality of repeated units in adjacent two lines may be optionally disposed symmetrically, the two first auxiliary portions 130 of the two adjacent repeated units located in the same line may be optionally connected to each other, and the two second auxiliary portions 140 of the two adjacent repeated lines located in the same line may be optionally connected to each other. However, the disclosure is not limited to the embodiment. In other embodiments, the two first auxiliary portions 130 of the two adjacent repeated units located in the same line may also be separated from each other, and the two second auxiliary portions 140 of the two adjacent repeated units located in the same line may also be separated from each other. Descriptions accompanied by other drawings are presented below.

FIG. 8 is a cross-sectional view of a display panel LCD of the pixel structure 10 according to the first embodiment of the disclosure. In particular, FIG. 8 shows a cross section of the pixel structure 10 taken along line A-A' of FIG. 4, and the film layer below the first electrode 100 is omitted from the cross section of the pixel structure 10 of FIG. 8. Referring to FIG. 8, the display panel LCD includes a first substrate 50, the pixel structure 10 disposed on the first substrate 50, a second substrate 60 disposed opposite the first substrate 50, and a plurality of liquid crystal molecules LC disposed between the first substrate 50 and the second substrate 60. In the embodiment, the display panel LCD further includes a first alignment film AL1 that is disposed on the pixel structure 10 and a second alignment film AL2 that is disposed on the second substrate 60. The plurality of liquid crystal molecules LC are disposed between the first alignment film AL1 and the second alignment film AL2.

In the embodiment, the plurality of liquid crystal molecules LC are positive-type liquid crystal molecules, a rubbing direction RD1 of the first alignment film AL1 is perpendicular to the first direction D1, the second alignment film AL2 may have a rubbing direction RD2 that is opposite to the rubbing direction RD1 of the first alignment film AL1, and the rubbing direction RD1 of the first alignment film AL1 is substantially parallel to the rubbing direction RD2 of the second alignment film AL2. However, the disclosure is not limited to the embodiment.

FIG. 9 is a cross-sectional view of another display panel LCD' of the pixel structure 10 according to the first embodiment of the disclosure. The display panel LCD' of FIG. 9 is similar to the display panel LCD of FIG. 8. The difference between the display panels LCD' and LCD is that the plurality of liquid crystal molecules LC of FIG. 9 are negative-type liquid crystal molecules. The rubbing direction RD1 of the first alignment film AL1 and the rubbing direction RD2 of the second alignment film AL2 are parallel to the first direction D1. However, the disclosure is not limited to the embodiment.

Figure 11:
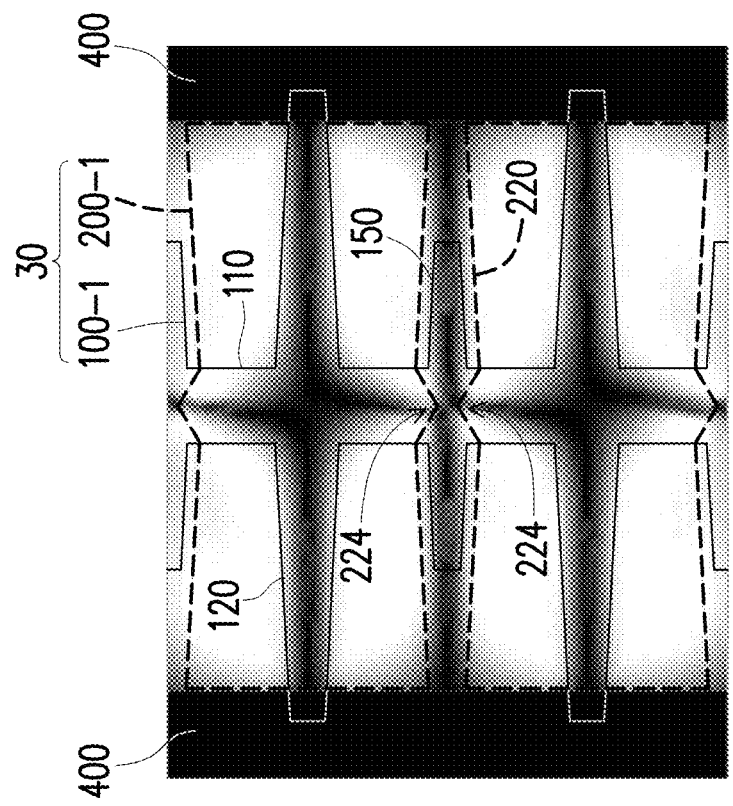
FIG. 11 is an enlarged front view of a display panel using a pixel structure according to a first comparative example of the disclosure driven by voltages.
Figure 10:
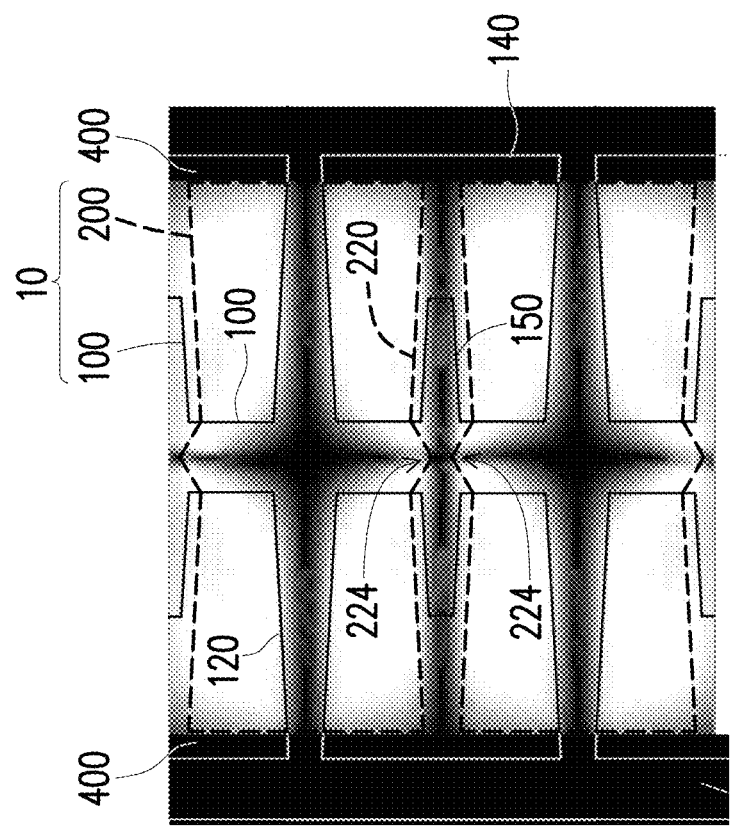
FIG. 10 is an enlarged front view of a display panel using a pixel structure according to a first embodiment of the disclosure driven by voltages.

FIG. 10 is an enlarged front view of a display panel of the pixel structure 10 according to the first embodiment of the disclosure driven by voltages. FIG. 11 is an enlarged front view of a display panel of a pixel structure 30 according to the first comparative example of the disclosure driven by voltages. In particular, FIG. 10 illustrates that the pixel structure 10 is disposed between polarizing plates having two transparent axes that are perpendicular to each other and shows the light penetration when voltages of 6 volts and 0 volt are applied to the first electrode 100 and the second electrode 200 of the pixel structure 10 respectively. In detail, the transparent axis of one of the polarizing plates that are perpendicular to each other is parallel to the first direction D1. FIG. 11 illustrates that the pixel structure 30 is disposed between polarizing plates having two transparent axes that are perpendicular to each other and shows the light penetration when voltages of 6 volts and 0 volt are applied to a first electrode 100-1 and a second electrode 200-1 of the pixel structure 30 respectively. In detail, the transparent axis of one of the polarizing plates that are perpendicular to each other is parallel to the first direction D1. The pixel structure 10 according to the embodiment of FIG. 10 is similar to the pixel structure 30 according to the first comparative example of FIG. 11. The difference between the pixel structures 10 and 30 is that the pixel structure 30 according to the first comparative example of FIG. 11 does not have the first auxiliary portion 130 and the second auxiliary portion 140 in the same way as the pixel structure 10 according to the first embodiment does.

Referring to FIGS. 10 and 11, compared with the first embodiment, since the first electrode 100-1 according to the first comparative example does not have the first auxiliary portion 130 and the second auxiliary portion 140, the location of disclination lines are deviated from a central axis of the main portion 110. In other words, cross nodes formed by the disclination lines are rather asymmetric. Referring to FIGS. 2 to 4, compared with the first comparative example, since the edge 250a of the peripheral portion 250 of the second electrode 200 according to the embodiment is aligned with the edge 130a of the first auxiliary portion 130 of the first electrode 100, and the edge 250a of the peripheral portion 250 of the second electrode 200 is aligned with the edge 140a of the second auxiliary portion 140 of the first electrode 100, it is possible to enhance the recoverability of the arrangement of the plurality of liquid crystal molecules after the plurality of liquid crystal molecules LC are pressed by forces while being operated with high voltages.

Figure 12:
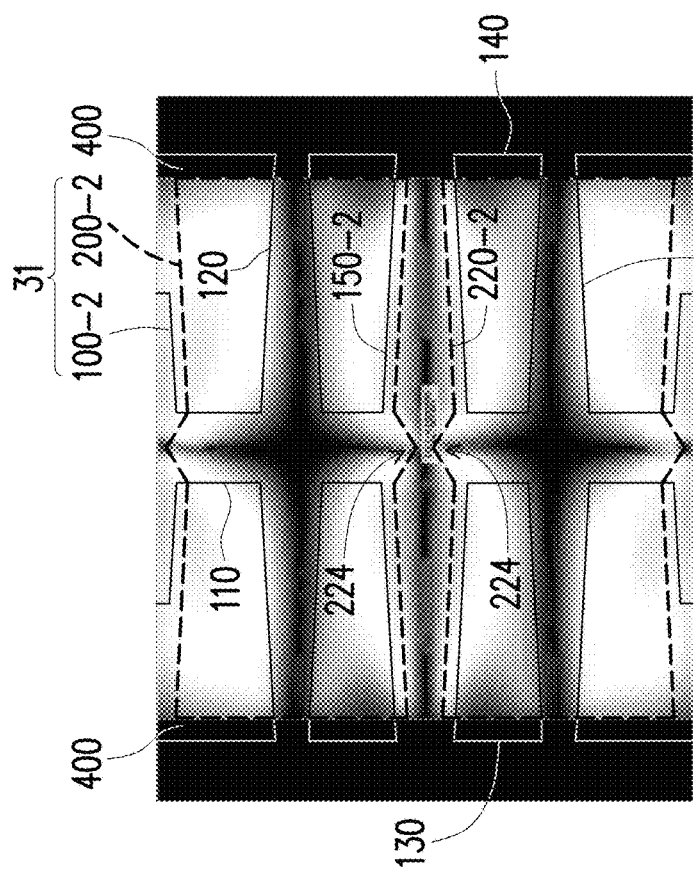
FIG. 12 is an enlarged front view of a display panel using a pixel structure according to a second comparative example of the disclosure driven by voltages.

FIG. 12 is an enlarged front view of a display panel using a pixel structure 31 according to the second comparative example of the disclosure driven by voltages. In particular, FIG. 12 illustrates that the pixel structure 31 is disposed between polarizing plates having two transparent axes that are perpendicular to each other and shows the light penetration when voltages of 6 volts and 0 volt are applied to a first electrode 100-2 and a second electrode 200-2 of the pixel structure 31 respectively. In detail, the transparent axis of one of the two polarizing plates that are perpendicular to each other is parallel to the first direction D1. The pixel structure 31 according to the second comparative example of FIG. 12 is similar to the pixel structure 10 according to the first embodiment of FIG. 10. The difference between the pixel structures 10 and 31 is that a projected area of a third auxiliary portion 150-2 of the first electrode 100-2 of the pixel structure 31 according to the second comparative example of FIG. 12 on the second electrode 200-2 surpasses a second branch portion 220-2 of the second electrode 200-2.

Referring to FIGS. 10 and 12, compared with the second comparative example of FIG. 12, in the first embodiment of FIG. 10, two horizontal disclination lines overlapping the two first branch portions 120 are rather concentrated on a horizontal central axis of the two first branch portions 120. Therefore, the pixel structure 10 according to the first embodiment may provide higher transmittance and shorter response time of liquid crystal molecules.

Figure 13:
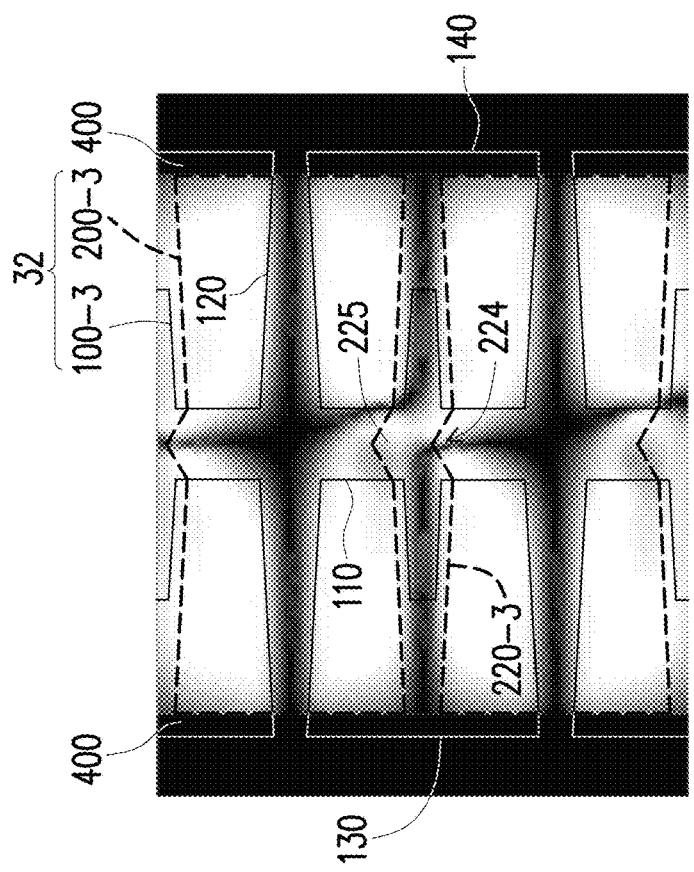
FIG. 13 is an enlarged front view of a display panel using a pixel structure according to a third comparative example of the disclosure driven by voltages.

FIG. 13 is an enlarged front view of a display panel using a pixel structure 32 according to the third comparative example of the disclosure. In particular, FIG. 13 illustrates that the pixel structure 32 is disposed between polarizing plates having two transparent axes that are perpendicular to each other and shows the light penetration when voltages of 6 volts and 0 volt are applied to a first electrode 100-3 and a second electrode 200-3 of the pixel structure 32 respectively. In detail, the transparent axis of one of the polarizing plates that are perpendicular to each other is parallel to the first direction D1. The pixel structure 32 according to the third comparative example of FIG. 13 is similar to the pixel structure 10 according to the first embodiment of FIG. 10. The difference between the pixel structures 10 and 32 is that the second electrode 200-3 of the pixel structure 32 according to the third comparative example of FIG. 13 has a notch 224 and a protrusion 225 that are opposite each other on the main portion 110 of the first electrode 100-3.

Referring to FIGS. 4, 10 and 13, compared with third comparative example, each of the second branch portions 220 of the second electrode 200 of the pixel structure 10 according to the first embodiment has the two notches 224 on the main portion 110. This way helps disclination lines be concentrated toward a central axis of the main portion 110 of the first electrode 100 and a central axis of the second branch portion 220 of the second electrode 200 concurrently. Thus, light transmittance improves and response time is further reduced.

Figure 14:
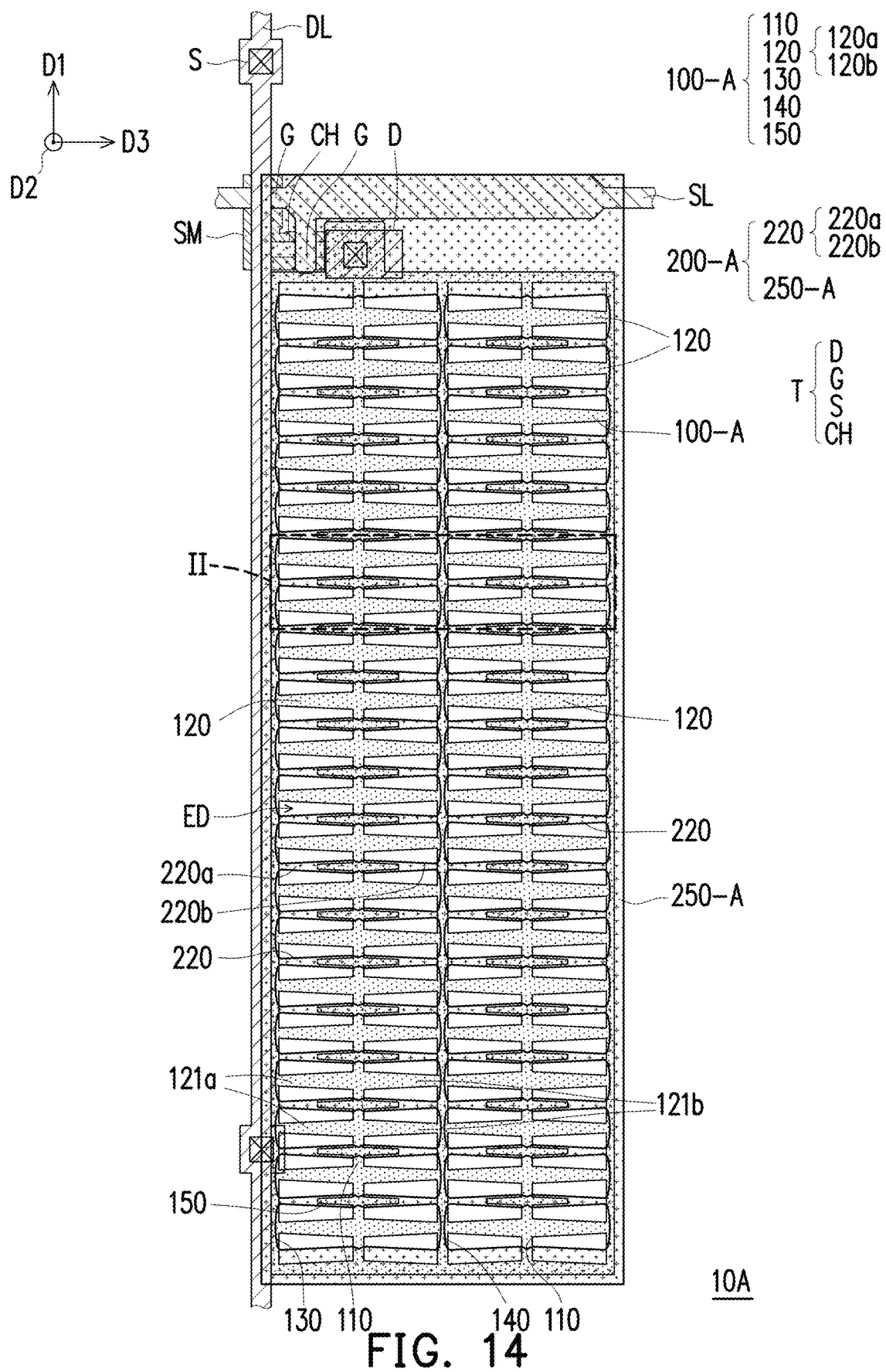
FIG. 14 is a front view of a pixel structure according to a second embodiment of the disclosure.
Figure 15:
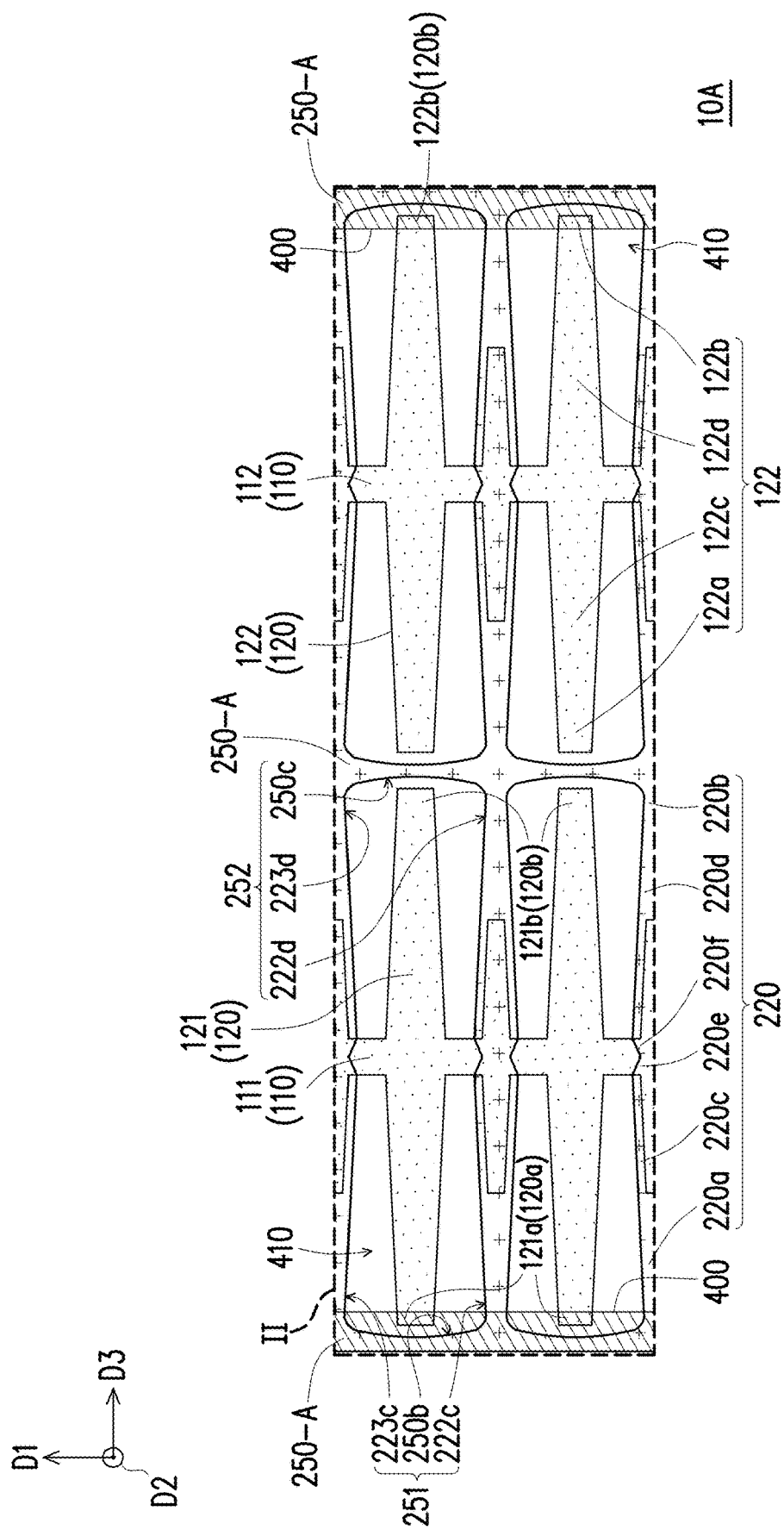
FIG. 15 is an enlarged view of a local area II of the pixel structure of FIG. 14.
Figure 16:
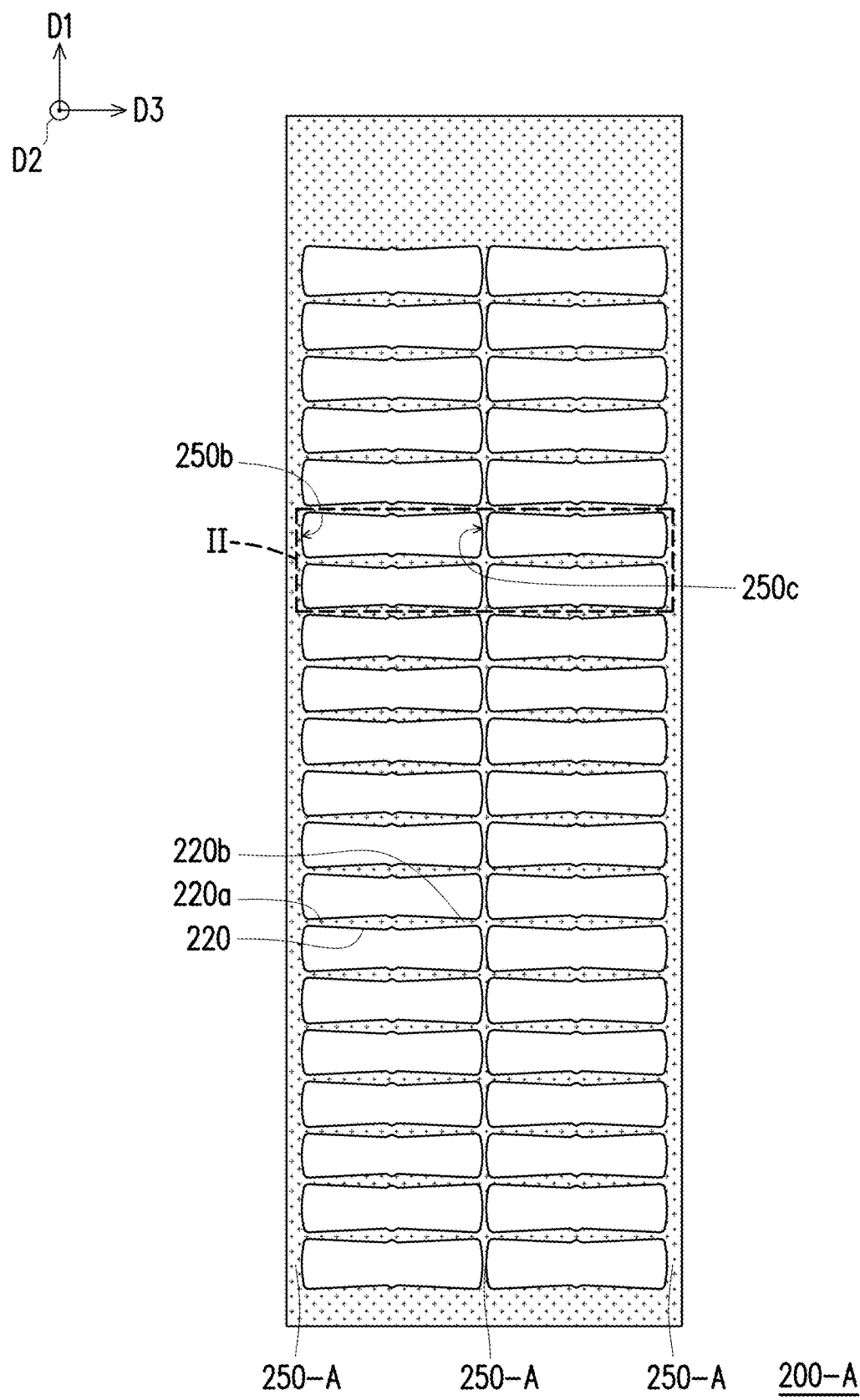
FIG. 16 is a front view of a second electrode of a pixel structure according to a second embodiment of the disclosure.

FIG. 14 is an enlarged view of a pixel structure 10A according to the second embodiment of the disclosure. FIG. 15 is an enlarged view of a local area II of the pixel structure 10A according to the second embodiment of the disclosure. FIG. 16 is a front view of the second electrode 200-A of the pixel structure 10A according to the second embodiment of the disclosure. It should be explained that for clear illustration, the light-shielding pattern layer 400 of FIG. 15 is omitted from FIG. 14.

Referring to FIGS. 14 to 16, the difference between the pixel structure 10A according to the embodiment and the pixel structure 10 according to the first embodiment is that a peripheral portion 250-A of the second electrode 200-A according to the embodiment has a plurality of arc-shaped edges 250b and 250c. The plurality of arc-shaped edges 250b and 250c and the plurality of second branch portions 220 define a plurality of notches 251 and 252. In detail, in the embodiment, each of the arc-shaped edges 250b of the peripheral portion 250-A is disposed between the two first ends 220a of the two adjacent second branch portions 220, each of the notches 251 adjacent to the first end 121a of the first branch portion 121 is formed by the arc-shaped edge 250b and the first edge 222c and the second edge 223c of the two adjacent second branch portions 220 that are opposite each other. Each of the arc-shaped edges 250c of the peripheral portion 250 is disposed between the two second ends 220b of the two adjacent second branch portions 220, and each of the notches 252 adjacent to the second end 121b of the first branch portion 121 is formed by the arc-shaped edge 250c and the first edge 222d and the second edge 223d of the two adjacent second branch portions 220 that are opposite each other.

Referring to FIG. 15, in the embodiment, the pixel structure 10A further includes the light-shielding pattern layer 400 having a pixel opening 410. The main portion 110 of the first electrode 100-A, the plurality of first branch portions 120 of the first electrode 100-A, and the plurality of second branch portions 220 of the second electrode 200-A overlap the pixel opening 410, and the light-shielding pattern layer 400 shields the plurality of notches 251. In particular, in the embodiment, at least a part of the first end 121a of the first branch portion 121 that crosses with the main portion 111 and at least a part of the second end 122b of each first branch portion 121 that crosses with the main portion 112 extend below the light-shielding pattern layer 400. In other words, the light-shielding pattern layer 400 shields the at least a part of the first end 121a of the first branch portion 121 that crosses with the main portion 111 and the at least a part of the second end 122b of the first branch portion 121 that crosses with the main portion 112. However, the disclosure is not limited to the embodiment.

Figure 18:
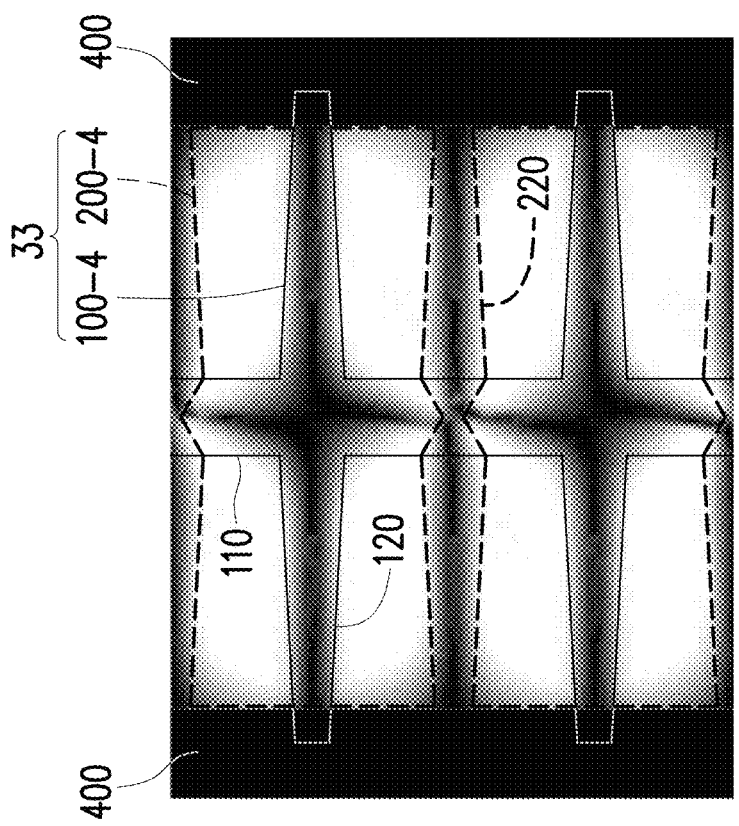
FIG. 18 is an enlarged view of a display panel using a pixel structure according to a fourth comparative example of the disclosure driven by voltages.
Figure 17:
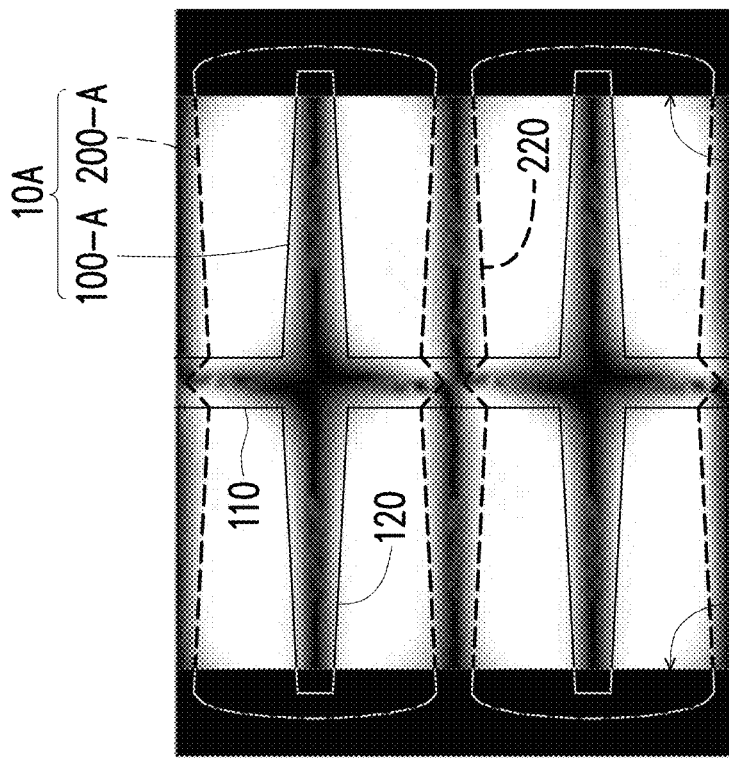
FIG. 17 is an enlarged view of a display panel using a pixel structure according to a second embodiment of the disclosure driven by voltages.

FIG. 17 is an enlarged view of a display panel using the pixel structure 10A according to the second embodiment of the disclosure driven by voltages. FIG. 18 is an enlarged view of a display panel using a pixel structure 33 according to the fourth comparative example of the disclosure driven by voltages. In particular, FIG. 17 illustrates that the pixel structure 10A is disposed between two polarizing plates having two transparent axes that are perpendicular to each other and shows the light penetration when voltages of 6 volts and 0 volt are applied to the first electrode 100-A and the second electrode 200-A of the pixel structure 10A respectively. In detail, the transparent axis of one of the polarizing plates that are perpendicular to each other is parallel to the first direction D1. FIG. 18 illustrates that the pixel structure 33 is disposed between polarizing plates having two transparent axes that are perpendicular to each other and shows the light penetration when voltages of 6 volts and 0 volt are applied to a first electrode 100-4 and a second electrode 200-4 of the pixel structure 33 respectively. In detail, the transparent axis of one of the polarizing plates that are perpendicular to each other is parallel to the first direction D1.

Referring to FIGS. 15, 17 and 18, compared with the fourth comparative example, since the second electrode 200-A of the pixel structure 10A according to the second embodiment has the plurality of notches 251 overlapping the light-shielding pattern layer 400, the disclination lines adjacent to the light-shielding pattern layer 400 is reduced, and furthermore, the response time is reduced and/or transmittance is raised.

Figure 19:
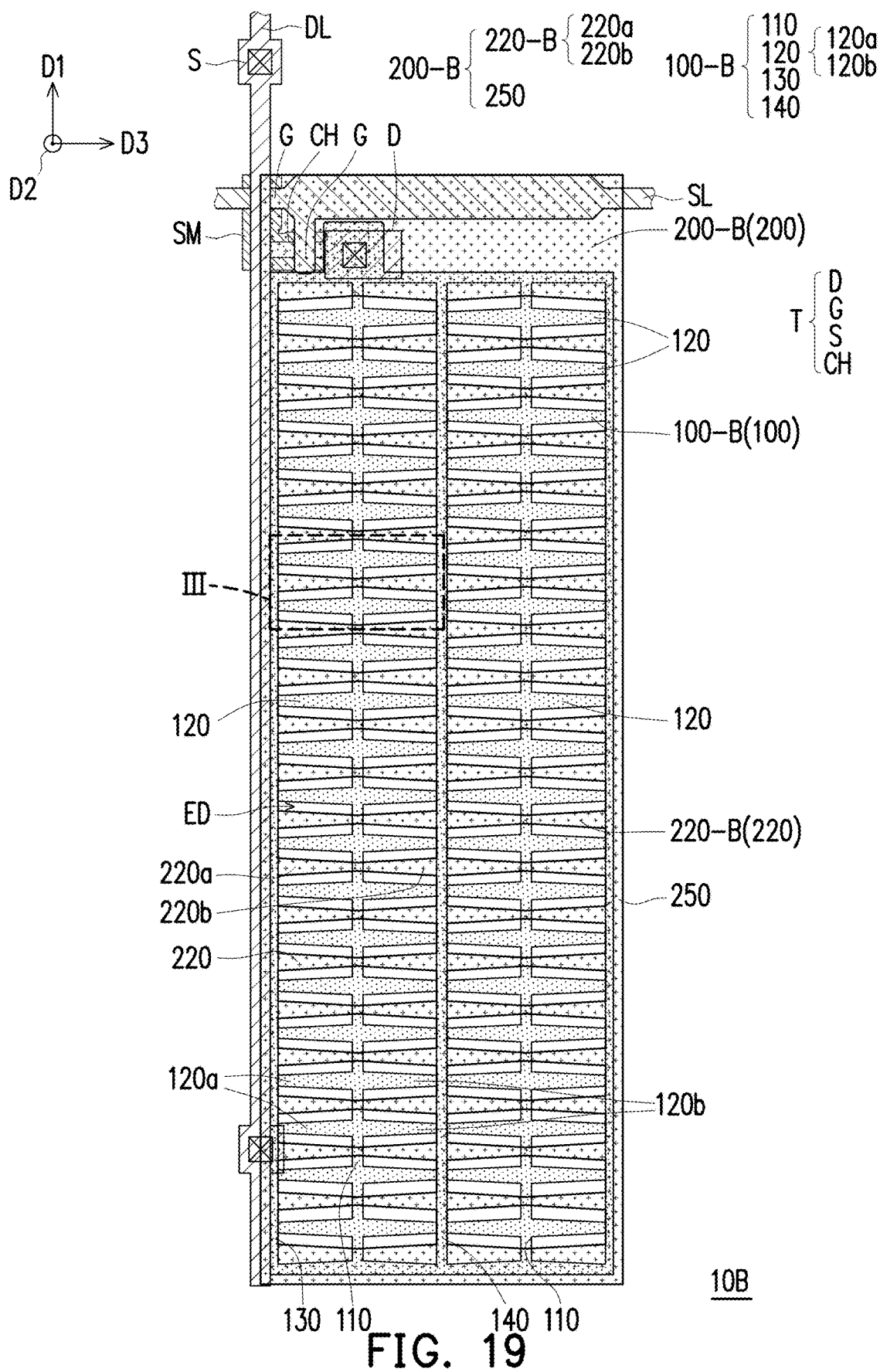
FIG. 19 is a front view of a pixel structure according to a third embodiment of the disclosure.
Figure 20:
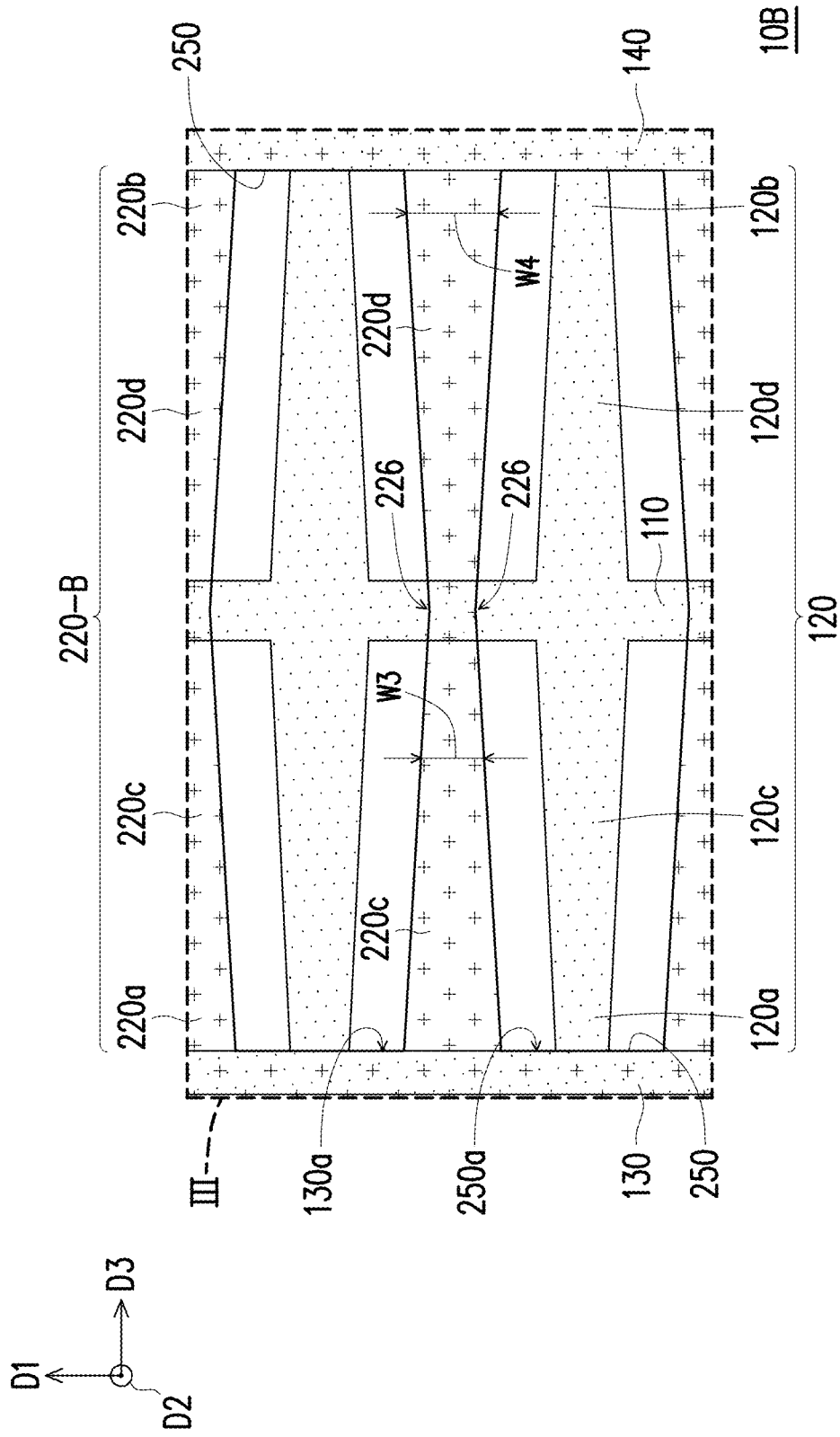
FIG. 20 is an enlarged view of a local area III of the pixel structure of FIG. 19.
Figure 21:
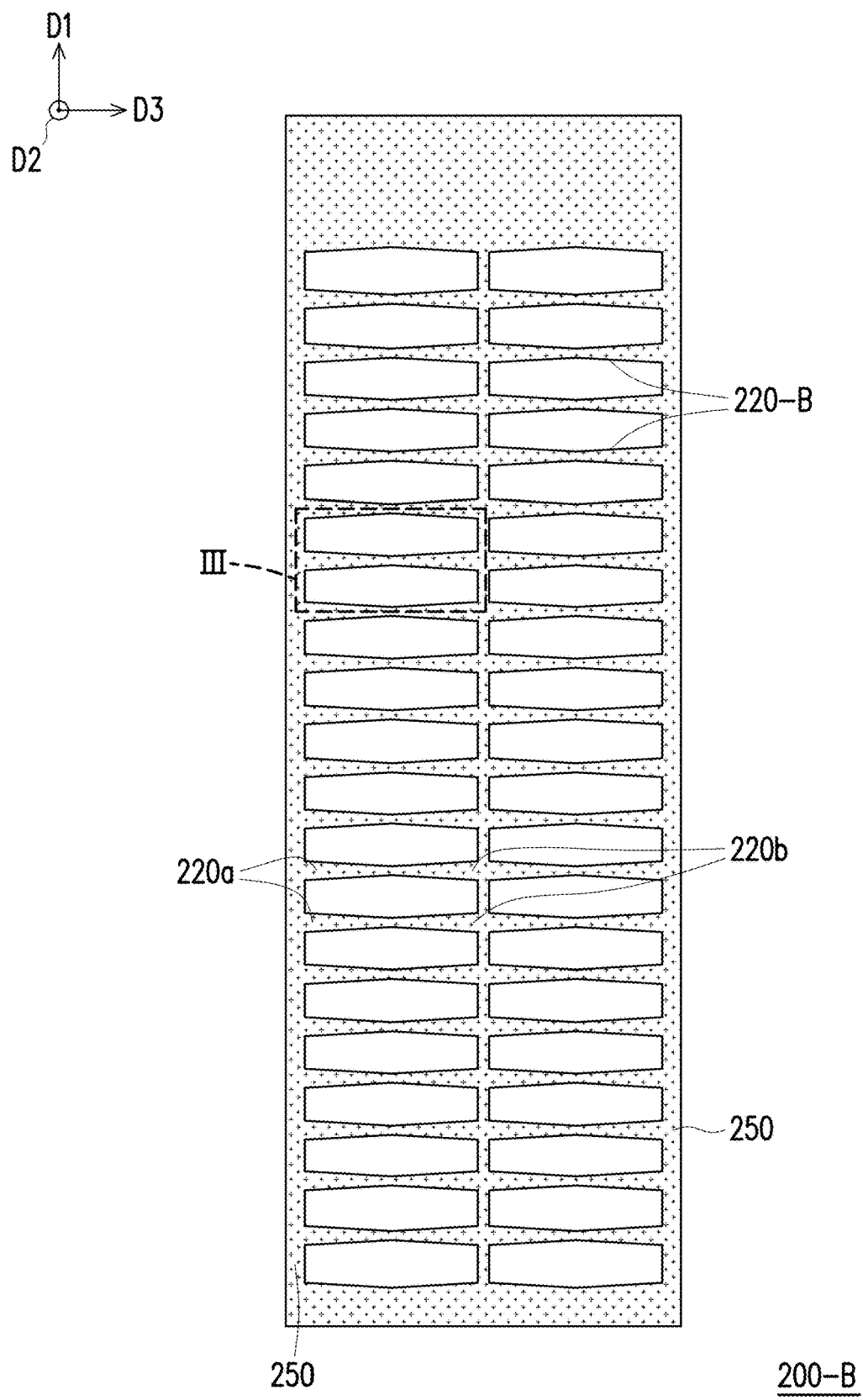
FIG. 21 is a front view of a second electrode of a pixel structure according to a third embodiment of the disclosure.

FIG. 19 is a front view of the pixel structure 10B according to the third embodiment of the disclosure. FIG. 20 is an enlarged view of a local area III of the pixel structure 10B according to the third embodiment of the disclosure. FIG. 21 is a front view of the second electrode 200-B of the pixel structure 10B according to the third embodiment of the disclosure.

Referring to FIGS. 19 to 21, the difference between the pixel structure 10B according to the embodiment and the pixel structure 10 according to the first embodiment is that the width W3 of the first sub portion 220c of each of the second branch portions 220-B of the second electrode 200-B according to the embodiment gradually decreases from the peripheral portion 250 to the main portion 110, and the width W4 of the second sub portion 220d of each of the second branch portions 220-B gradually decreases from the peripheral portion 250 to the main portion 110. For example, in the embodiment, the first sub portion 220c and the second sub portion 220d of each of the second branch portions 220-B is directly connected to each other on the main portion 110 of the first electrode 100-B to define two notches 226 that are recessed in opposite directions.

However, the disclosure is not limited to the embodiment. In the embodiment, since each of the second branch portions 220-B of the second electrode 200-B has the two notches 226 that are recessed in opposite directions, it benefits to make the disclination lines be concentrated toward the central axis of the main portion 110 of the first electrode 100-B and toward the central axis of the second branch portion 220-B of the second electrode 200-B.

Figure 22:
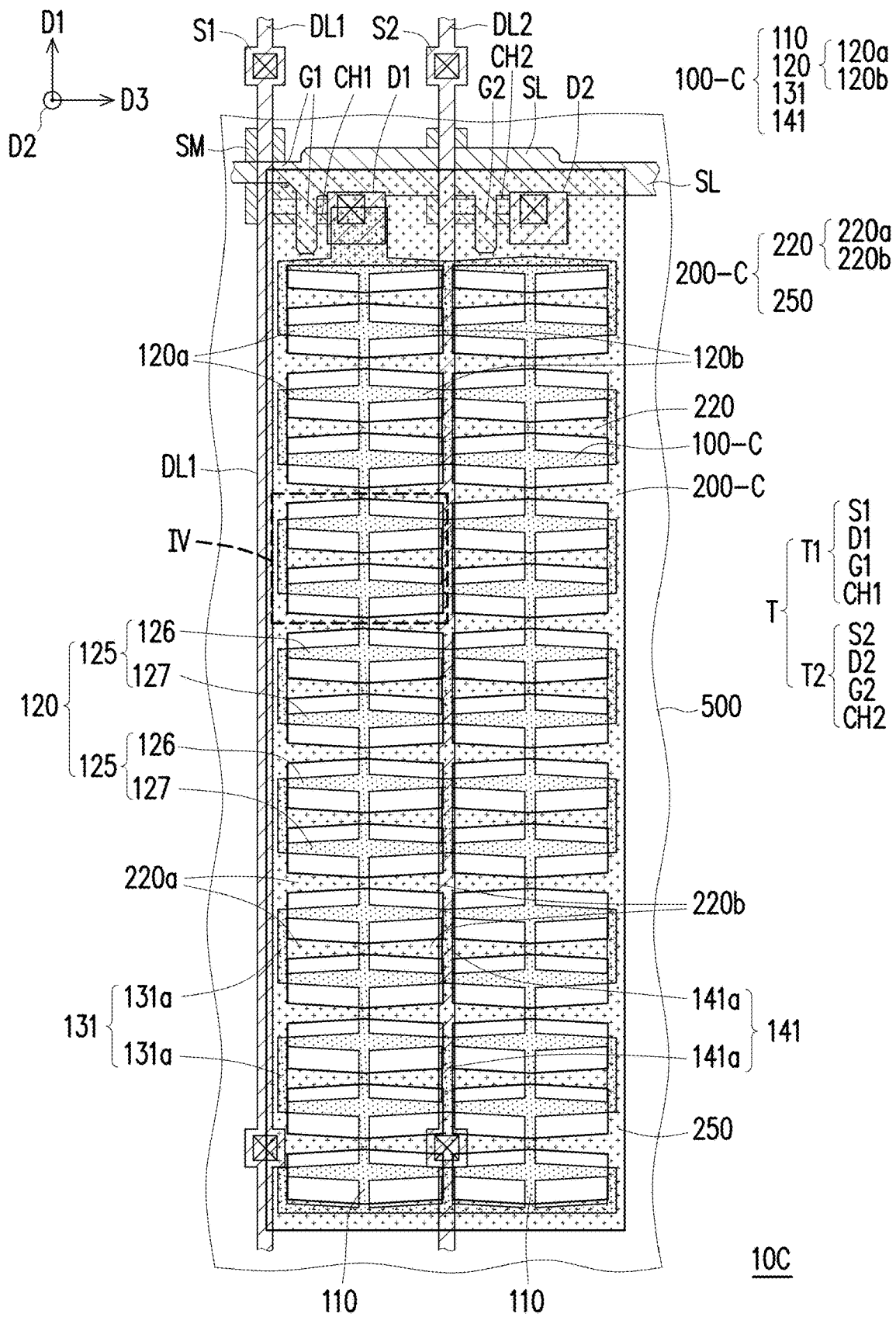
FIG. 22 is a front view of a pixel structure according to a fourth embodiment of the disclosure.
Figure 23:
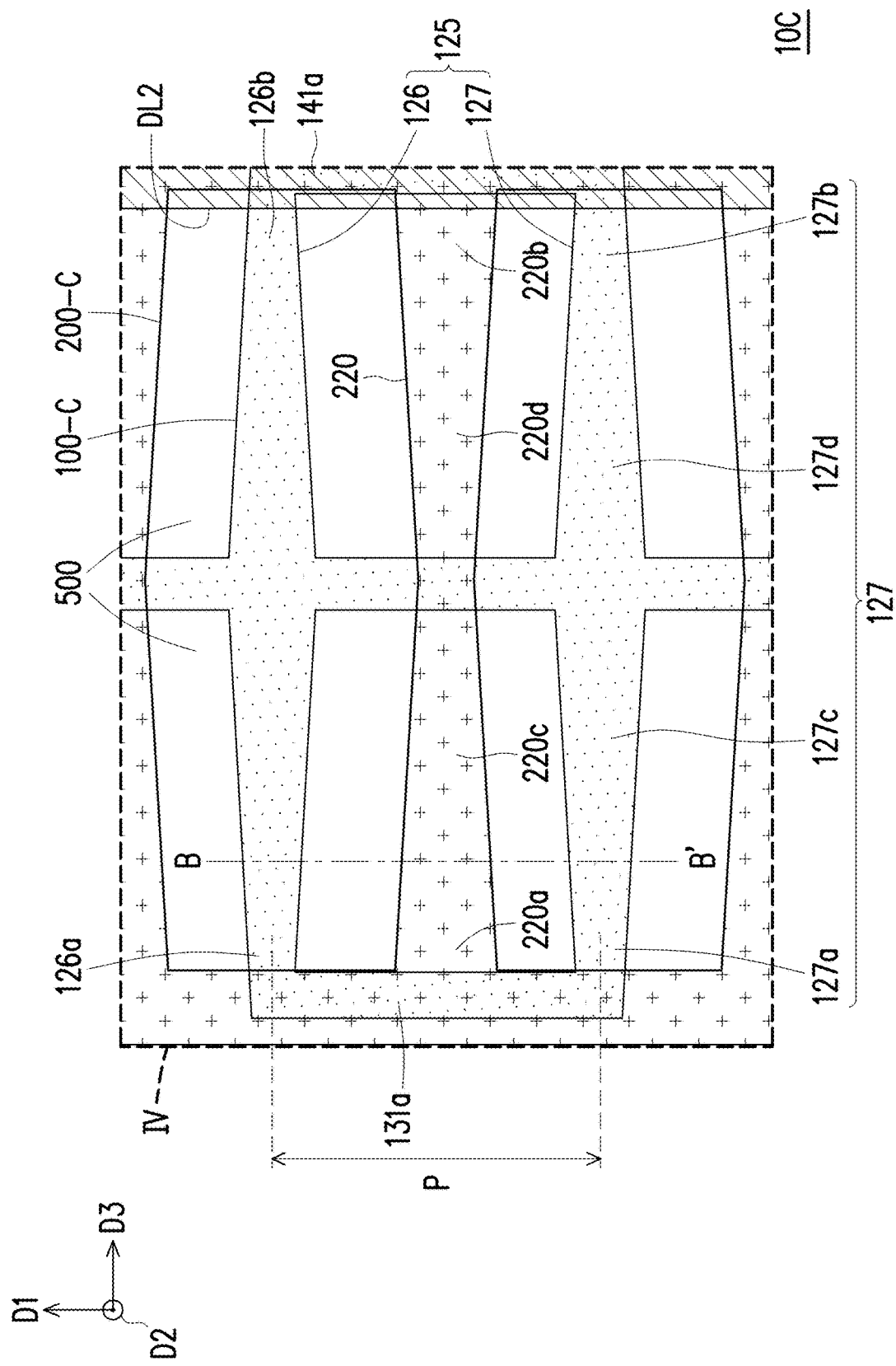
FIG. 23 is an enlarged view of a local area IV of the pixel structure of FIG. 22.
Figure 24:
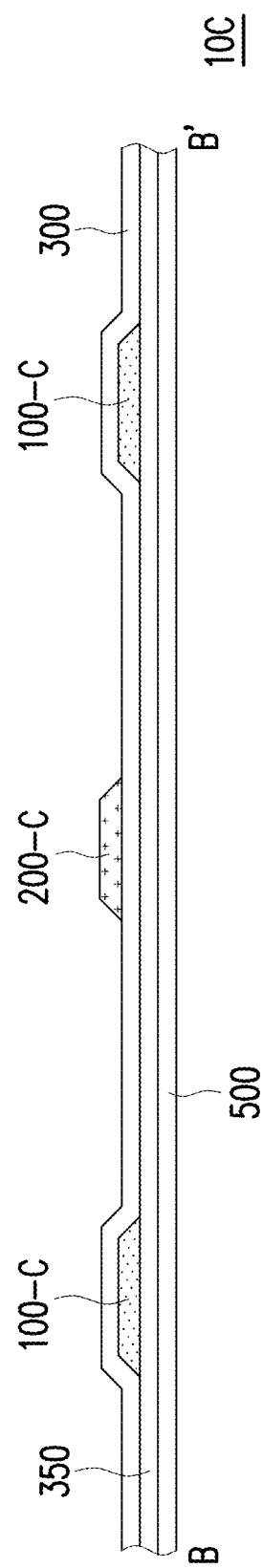
FIG. 24 is a cross-sectional view of a pixel structure according to a fourth embodiment of the disclosure.
Figure 25:
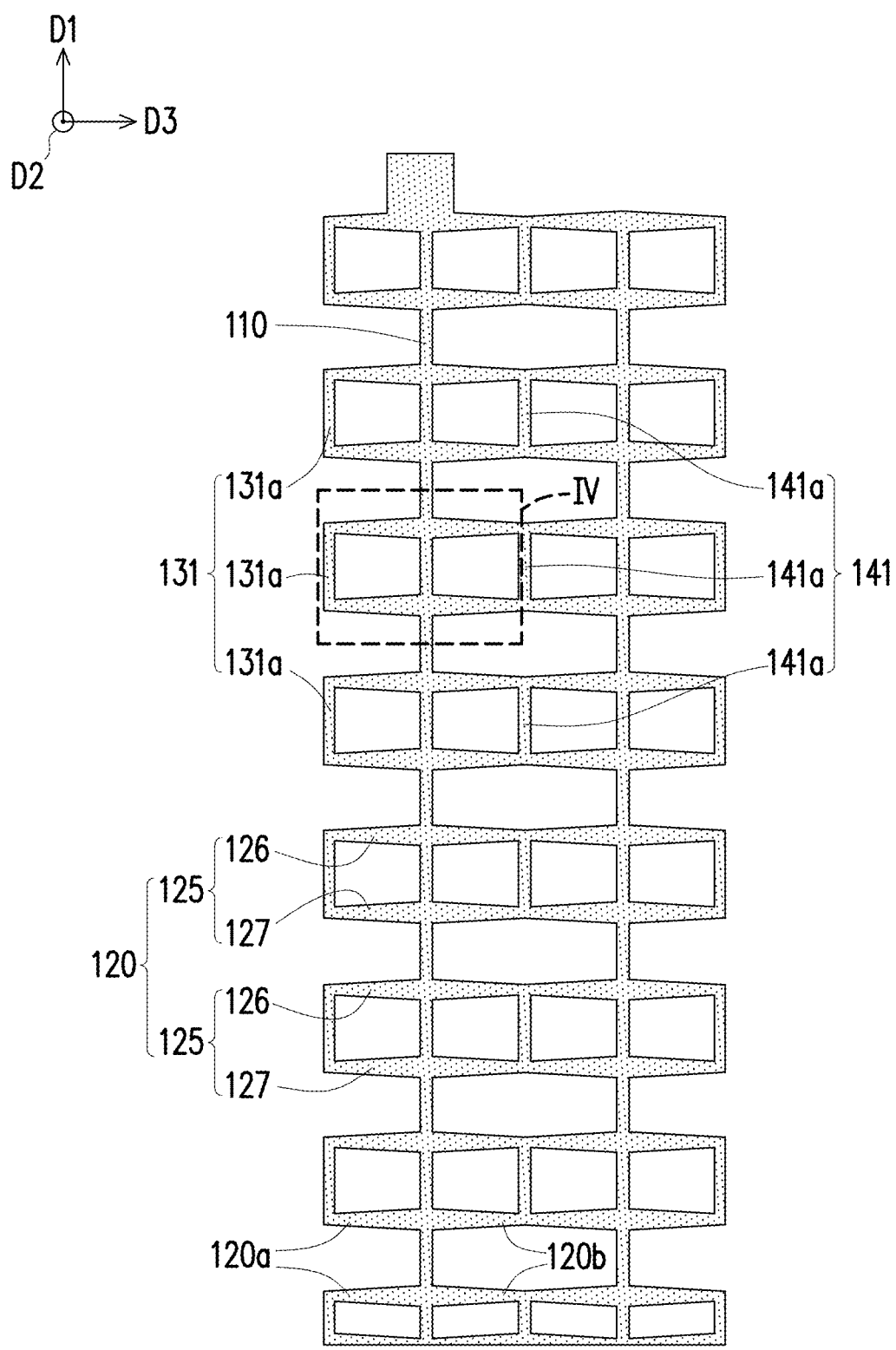
FIG. 25 is a front view of a first electrode of a pixel structure according to a fourth embodiment of the disclosure.

FIG. 22 is a front view of a pixel structure 10C according to the fourth embodiment of the disclosure. FIG. 23 is an enlarged view of a local area IV of the pixel structure 10C according to the fourth embodiment of the disclosure. FIG. 24 is a cross-sectional view of the pixel structure 10C according to the fourth embodiment of the disclosure. FIG. 25 is a front view of a first electrode 100-C of the pixel structure 10C according to the fourth embodiment of the disclosure. In particular, FIG. 24 is a cross section of FIG. 23 taken along line B-B', and a film layer below a third electrode 500 of the pixel structure 10C is omitted from FIG. 24.

Referring to FIG. 22, in the embodiment, the active device T of the pixel structure 10C includes a first thin-film transistor T1 and a second thin-film transistor T2. The pixel structure 10C further includes a first data line DL1, a second data line DL2 and the scan line SL. The first thin-film transistor T1 includes a source S1, a grain D1, a gate G1 and a semiconductor pattern CH1. The second thin-film transistor T2 includes a source S2, a grain D2, a gate G2 and a semiconductor pattern CH2. In the embodiment, the first data line DL1 is electrically connected to the source S1 of the first thin-film transistor T1, and the first electrode 100-C is electrically connected to the grain D1 of the first thin-film transistor T1. The second data line DL2 is electrically connected to the source S2 of the second thin-film transistor T2, and the second electrode 200-C is electrically connected to the grain D2 of the second thin-film transistor T2. The scan line SL crosses with the first data line DL1 and the second data line DL2 and is electrically connected to the gate G1 of the first thin-film transistor T1 and the gate G2 of the second thin-film transistor T2. For example, in the embodiment, the first electrode 100-C and the second electrode 200-C of the pixel structure 10C have a first drive signal and a second drive signal respectively. A waveform of the first drive signal is the same as a waveform of the second drive signal, and the polarity of the first drive signal is opposite to the polarity of the second drive signal. However, the disclosure is not limited to the embodiment.

Referring to FIGS. 23 and 24, in the embodiment, the pixel structure 10C further includes the third electrode 500 and a second insulating layer 35. For example, in the embodiment, the first electrode 100-C is disposed between the third electrode 500 and the second electrode 200-C, and the second insulating layer 350 is disposed between the first electrode 100-C and the third electrode 500. However, the disclosure is not limited to the embodiment. According to other embodiments, the second electrode 200-C may be disposed between the third electrode 500 and the first electrode 100-C, and the second insulating layer 350 may be disposed between the second electrode 200-C and the third electrode 500. Referring to FIG. 22 at the same time, in the embodiment, the third electrode 500 overlaps an area between the plurality of first branch portions 120 of the first electrode 100-C and the plurality of second branch portions 220 of the second electrode 200-C. In particular, in the embodiment, the first electrode 100-C and the second electrode 200-C, when being driven, may provide voltages of the same value and the opposite polarity. The third electrode 500 has a reference electric potential that may be a ground electric potential, a constant electric potential, a floating electric potential, or other appropriate types of electric potentials. For example, in the embodiment, the third electrode 500 is, for example, a transparent electrode whose material includes metallic oxides such as indium tin oxide, indium zinc oxide, aluminum tin oxide, aluminum zinc oxide, other appropriate oxides, or stacking layers of at least two of the above.

Referring to FIGS. 23 and 25, in the embodiment, the plurality of first branch portions 120 of the first electrode 100-C includes a plurality of first branch groups 125. Each of the first branch groups 125 has two adjacent first branch portions 126 and 127. However, the disclosure is not limited to the embodiment. According to other embodiments, each of the first branch groups 125 may have the three adjacent first branch portions 120. In the embodiment, a first auxiliary portion 131 of the first electrode 100-C has a plurality of first auxiliary sub portions 131a that are separated from each other, and a second auxiliary portion 141 of the first electrode 100-C has a plurality of second auxiliary sub portions 141a that are separated from each other. Each of the first auxiliary sub portions 131a is connected to two first ends 126a and 127a of the two adjacent first branch portions 126 and 127 of the corresponding first branch group 125. Each of the second auxiliary sub portions 141a is connected to two second ends 126b and 127b of the two adjacent first branch portions 126 and 127 of the corresponding first branch group 125.

Figure 26:
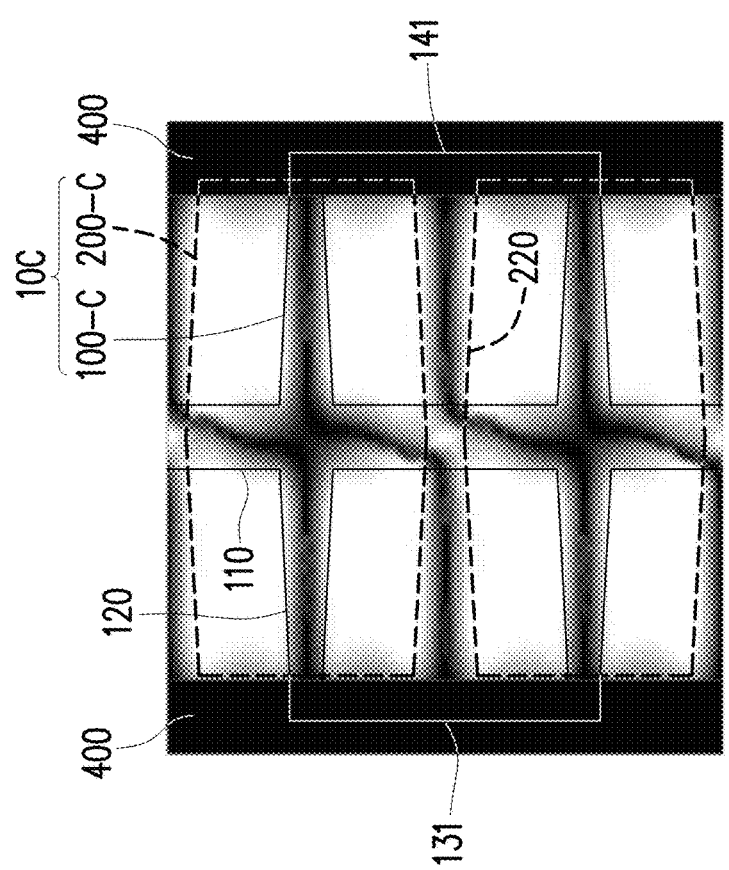
FIG. 26 is an enlarged front view of a display panel using a pixel structure according to a fourth embodiment of the disclosure driven by voltages.

FIG. 26 is an enlarged front view of a display panel using the pixel structure 10C according to the fourth embodiment of the disclosure driven by voltages. In particular, FIG. 26 illustrates that the pixel structure 10C is disposed between polarizing plates having two transparent axes that are perpendicular to each other and shows the light penetration when voltages of 3 volts, −3 voltages and 0 volt are applied to the first electrode 100-C, the second electrode 200-C and the third electrode 500 of the pixel structure 10C respectively. In detail, the transparent axis of one of the polarizing plates that are perpendicular to each other is parallel to the first direction D1. Referring to FIGS. 23 and 26, in the embodiment, a gap P between the first branch portions 126 and 127 of each of the first branch groups 125 is 13 micrometers, for example. Compared with the display panel of the pixel structure 10 according to the first embodiment, the transmittance of the display panel of the pixel structure 10C using the first electrode 100-C, the second electrode 200-C and the third electrode 500 may be further raised on the premise that the response times are similar.

Figure 27:
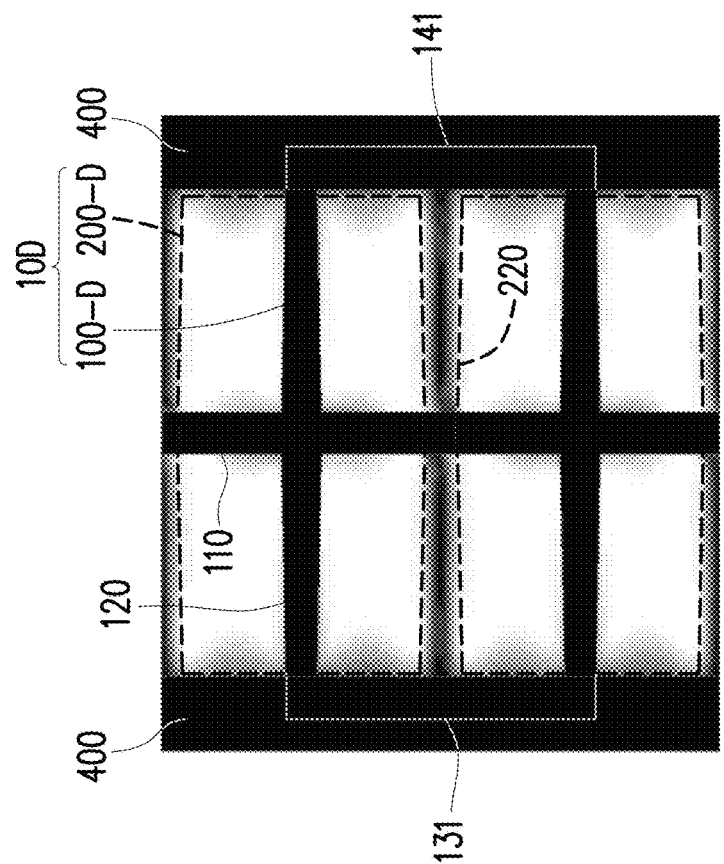
FIG. 27 is an enlarged front view of a display panel using a pixel structure according to a fifth embodiment of the disclosure driven by voltages.

FIG. 27 is an enlarged front view of a display panel of a pixel structure 10D according to the fifth embodiment of the disclosure. In particular, FIG. 27 illustrates that the pixel structure 10D is disposed between polarizing plates having two transparent axes that are perpendicular to each other and shows the light penetration when voltages of 6 volts and 0 volt are applied to a first electrode 100-D and a second electrode 200-D of the pixel structure 10D respectively. In detail, the transparent axis of one of the polarizing plates that are perpendicular to each other is parallel to the first direction D1.

Referring to FIGS. 26 and 27, the difference between the pixel structure 10D according to the embodiment and the pixel structure 10C according to the fourth embodiment is that a material of the first electrode 100-D according to the embodiment is a light-shielding conductive material such as metals or alloys. Compared with the pixel structure 10C according to the fourth embodiment, the first electrode 100-D of the pixel structure 10D according to the embodiment is formed by light-shielding materials. Therefore, the first electrode 100-D can shield the disclination lines appearing at a location where the first electrode 100-D is disposed. In this way, it benefits to reduce the luminance in the dark state of the display panel using the pixel structure 10D and increase contrast. Additionally, the main portion 110 and the first branch portion 120 of the first electrode 100-D according to the embodiment allow the disclination lines to be concentrated toward the central axes of the main portion 110 and the first branch portion 120 of the first electrode 100-D by a geomorphological process of a metal material layer. Therefore, compared with the pixel structure 10C according to the fourth embodiment of the disclosure, the main portion 110 and the first branch portion 120 of the first electrode 100-D according to the embodiment may have a narrower width. In this way, the light transmittance is further raised. However, the disclosure is not limited to the embodiment. According to other embodiments, at least a part of the first electrode 100-D (the main portion 110, the first branch portion 120, the second branch portion 220, or a combination of at least two of the above) may be made of thin metals having a thickness between 300 Å and 1000 Å. Specifically, the first electrode 100-D may be molybdenum metal having a thickness between 300 Å and 1000 Å.

In view of the foregoing, for the pixel structure according to the embodiments of the disclosure, the aperture ratio of the pixel structure is raised through the first auxiliary portion and the second auxiliary portion of the first electrode overlapping the peripheral portion of the second electrode respectively on the premise that sufficient storage capacitances are available. Additionally, when the display panel using the pixel structure according to the embodiment of the disclosure is operated with appropriate drive voltages and the display panel is pressed, the recoverability of the arrangement of the liquid crystal molecules of the pixel structure is preferable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure comprising:
an active device;
a first electrode, comprising:
a main portion, extending in a first direction;
a plurality of first branch portions, crossing with the main portion, each of the first branch portions having a first end and a second end on two opposite sides of the main portion respectively;
a first auxiliary portion, connected to the plurality of first ends of the first branch portions;
a second auxiliary portion, connected to the plurality of second ends of the first branch portions; and
a third auxiliary portion, disposed between two adjacent first branch portions of the plurality of first branch portions, crossing with the main portion and separated from the first auxiliary portion and the second auxiliary portion;
a second electrode, wherein the first electrode or the second electrode is electrically connected to the active device, a first insulating layer is disposed between the first electrode and the second electrode, and the second electrode comprises:
a plurality of second branch portions, crossing with the main portion, wherein the first branch portions and the second branch portions are arranged alternately in the first direction, each of the second branch portions having a first end and a second end located on two opposite sides of the main portion respectively; and
a peripheral portion, connected to the plurality of first ends of the second branch portions and the plurality of second ends of the second branch portions, wherein the first auxiliary portion of the first electrode and the second auxiliary portion of the first electrode overlap the peripheral portion of the second electrode, and the third auxiliary portion of the first electrode overlaps one of the plurality of second branch portions of the second electrode.

2. The pixel structure according to claim 1, further comprising:
a light-shielding pattern layer, having a pixel opening, wherein the main portion of the first electrode, the first branch portions of the first electrode and the second branch portions of the second electrode overlap the pixel opening, the second branch portions of the second electrode and the peripheral portion of the second electrode define a plurality of grooves, and the light-shielding pattern layer shields the grooves.

3. The pixel structure according to claim 1, wherein the first insulating layer covers the first electrode, the second electrode is disposed on the first insulating layer, and the third auxiliary portion of the first electrode is located within a normal projection area of the one of the plurality of second branch portions of the second electrode.

4. The pixel structure according to claim 1, wherein the third auxiliary portion has an edge that is neither parallel to nor perpendicular to the first direction, the one of the plurality of second branch portions of the second electrode has an edge that is neither parallel to nor perpendicular to the first direction, and the edge of the third auxiliary portion is parallel to the edge of the one of the plurality of second branch portions of the second electrode.

5. The pixel structure according to claim 1, wherein each of the second branch portions further comprises:
a first sub portion and a second sub portion, located on two opposite sides of the main portion respectively, wherein a width of the first sub portion gradually increases from the peripheral portion to the main portion, and a width of the second sub portion gradually increases from the peripheral portion to the main portion.

6. The pixel structure according to claim 5, wherein each of the second branch portions further comprises:
a third sub portion and a fourth sub portion, located on the main portion, wherein the third sub portion is connected between the first sub portion and the fourth sub portion, a width of the third sub portion gradually decreases from the first sub portion to the fourth sub portion, the fourth sub portion is connected between the third sub portion and the second sub portion, a width of the fourth sub portion gradually decreases from the second sub portion to the third sub portion, and the third sub portion and the fourth sub portion are connected to each other to define two notches recessed in two opposite directions.

7. The pixel structure according to claim 1, further comprising:
a light-shielding pattern layer, having a pixel opening, wherein the main portion of the first electrode, the first branch portions of the first electrode and the second branch portions of the second electrode overlap the pixel opening, the first end of each of the first branch portions extends below the light-shielding pattern layer which shields the first end of each of the first branch portions, the first auxiliary portion, and the second auxiliary portion.

8. The pixel structure according to claim 1, wherein each of the first branch portions further comprises:
a first sub portion and a second sub portion, located on two opposite sides of the main portion respectively, wherein a width of the first sub portion gradually decreases from the main portion to the first auxiliary portion, and a width of the second sub portion gradually decreases from the main portion to the second auxiliary portion.

9. A pixel structure comprising:
an active device;
a first electrode, comprising:
 a main portion, extending in a first direction;
 a plurality of first branch portions, crossing with the main portion, each of the first branch portions having a first end and a second end on two opposite sides of the main portion respectively;
 a first auxiliary portion, connected to the plurality of first ends of the first branch portions; and
 a second auxiliary portion, connected to the plurality of second ends of the first branch portions;
a second electrode, wherein the first electrode or the second electrode is electrically connected to the active device, a first insulating layer is disposed between the first electrode and the second electrode, and the second electrode comprises:
a plurality of second branch portions, crossing with the main portion, wherein the first branch portions and the second branch portions are arranged alternately in the first direction, each of the second branch portions having a first end and a second end located on two opposite sides of the main portion respectively; and
a peripheral portion, connected to the plurality of first ends of the second branch portions and the plurality of second ends of the second branch portions, wherein the first auxiliary portion of the first electrode and the second auxiliary portion of the first electrode overlap the peripheral portion of the second electrode,
wherein each of the first branch portions further comprises: a first sub portion and a second sub portion, located on two opposite sides of the main portion respectively, wherein a width of the first sub portion gradually decreases from the main portion to the first auxiliary portion, and a width of the second sub portion gradually decreases from the main portion to the second auxiliary portion, and
each of the second branch portions further comprises:
a first sub portion and a second sub portion, located on two opposite sides of the main portion respectively,
wherein the first sub portion of the first branch portion has a first edge and a second edge which are opposite each other and are not parallel to each other, the first sub portion of the second branch portion has a first edge and a second edge which are opposite each other and are not parallel to each other, the first edge of the first sub portion of the first branch portion is parallel to the first edge of the first sub portion of the second branch portion, and the second edge of the first sub portion of the first branch portion is parallel to the second edge of the first sub portion of the second branch portion, and
wherein the second sub portion of the first branch portion has a first edge and a second edge which are opposite each other and are not parallel to each other, the second sub portion of the second branch portion has a first edge and a second edge which are opposite each other and are not parallel to each other, the first edge of the second sub portion of the first branch portion is parallel to the first edge of the second sub portion of the second branch portion, and the second edge of the second sub portion of the first branch portion is parallel to the second edge of the second sub portion of the second branch portion.

10. The pixel structure according to claim 9, further comprising:
a light-shielding pattern layer, having a pixel opening, wherein the main portion of the first electrode, the first branch portions of the first electrode and the second branch portions of the second electrode overlap the pixel opening, the second branch portions of the second electrode and the peripheral portion of the second electrode define a plurality of grooves, and the light-shielding pattern layer shields the grooves.

11. The pixel structure according to claim 10, wherein the first end of each of the first branch portions and the second end of each of the first branch portions extend below the light-shielding pattern layer which shields the first end of each of the first branch portions, the second end of each of the first branch portions, the first auxiliary portion, and the second auxiliary portion.

12. The pixel structure according to claim 9, wherein the first electrode further comprises:
a third auxiliary portion, disposed between two adjacent first branch portions of the plurality of first branch portions, crossing with the main portion and separated from the first auxiliary portion and the second auxiliary portion, wherein the third auxiliary portion of the first electrode overlaps a second branch portion of the plurality of second branch portions of the second electrode.

13. The pixel structure according to claim 1, wherein the first branch portions comprise a plurality of first branch groups which are arranged along the first direction, each of the first branch groups comprises at least two first branch portions, the first auxiliary portion comprises a plurality of first auxiliary sub portions which are separated from each other, and each of the first auxiliary sub portions is connected to the plurality of first ends of the at least two first branch portions of a corresponding first branch group of the first branch groups.

14. The pixel structure according to claim 9, wherein the first electrode further comprises:
a third auxiliary portion, disposed between two adjacent first branch portions of the plurality of first branch portions, crossing with the main portion and separated from the first auxiliary portion and the second auxiliary portion, wherein the third auxiliary portion of the first electrode overlaps a second branch portion of the plurality of second branch portions of the second electrode, the first insulating layer covers the first electrode, the second electrode is disposed on the first insulating layer, and the third auxiliary portion of the first electrode is located within a normal projection area of the second branch portion of the second electrode.

15. The pixel structure according to claim 9, wherein each of the second branch portions further comprises:
a first sub portion and a second sub portion, located on two opposite sides of the main portion respectively, wherein a width of the first sub portion gradually increases from the peripheral portion to the main portion, and a width of the second sub portion gradually increases from the peripheral portion to the main portion.

16. The pixel structure according to claim 9, further comprising:
a third electrode, wherein a second insulating layer is disposed between the first electrode and the third electrode or between the second electrode and third electrode, and the third electrode overlaps an area between the first branch portions of the first electrode and the second branch portions of the second electrode.

17. The pixel structure according to claim 9, wherein each of the second branch portions comprises:
a first sub portion and a second sub portion, located on two opposite sides of the main portion respectively, wherein a width of the first sub portion gradually decreases from the peripheral portion to the main portion, and a width of the second sub portion gradually decreases from the peripheral portion to the main portion.

18. The pixel structure according to claim 16, wherein the first electrode and the second electrode have a first drive signal and a second drive signal respectively, wherein a waveform of the first drive signal is the same as a waveform of the second drive signal, and the polarity of the first drive signal is opposite to the polarity of the second drive signal.

19. The pixel structure according to claim 1, wherein a material of the main portion, materials of the first branch portions, materials of the second branch portions, or a combination of at least two of the materials comprise light-shielding conductive materials.

20. The pixel structure according to claim 1, wherein a material of the main portion, materials of the first branch portions, materials of the second branch portions, or a combination of at least two of the materials are metals having a thickness between 300 Å and 1000 Å.

* * * * *